(12) United States Patent
Liu

(10) Patent No.: US 12,400,066 B2
(45) Date of Patent: Aug. 26, 2025

(54) INTEGRATED CIRCUIT OPTIMIZATION SYSTEM AND METHOD BASED ON MULTI-PHASE LEVEL-SENSITIVE LATCHES

(71) Applicant: Bao Liu, Fremont, CA (US)

(72) Inventor: Bao Liu, Fremont, CA (US)

( * ) Notice: Subject to any disclaimer, the term of this patent is extended or adjusted under 35 U.S.C. 154(b) by 329 days.

(21) Appl. No.: 16/467,485

(22) PCT Filed: Aug. 16, 2017

(86) PCT No.: PCT/US2017/047039
§ 371 (c)(1),
(2) Date: Jun. 6, 2019

(87) PCT Pub. No.: WO2018/132131
PCT Pub. Date: Jul. 19, 2018

(65) Prior Publication Data
US 2024/0232501 A1 Jul. 11, 2024

Related U.S. Application Data

(60) Provisional application No. 62/446,494, filed on Jan. 15, 2017.

(51) Int. Cl.
*G06F 30/398* (2020.01)
*G06F 30/327* (2020.01)
*G06F 30/3315* (2020.01)
*G06F 119/12* (2020.01)

(52) U.S. Cl.
CPC .......... *G06F 30/398* (2020.01); *G06F 30/327* (2020.01); *G06F 30/3315* (2020.01); *G06F 2119/12* (2020.01)

(58) Field of Classification Search
CPC .......................... G06F 30/398; G06F 30/3315
USPC ........................................................ 716/101
See application file for complete search history.

(56) References Cited

U.S. PATENT DOCUMENTS

| 5,553,000 A | 9/1996 | Dey et al. |
| 7,278,080 B2 | 10/2007 | Flautner et al. |
| 7,346,861 B1 * | 3/2008 | Lee .......... G06F 30/35 716/108 |
| 7,743,354 B2 | 6/2010 | Albrecht et al. |

(Continued)

OTHER PUBLICATIONS

V. De, A. B. Kahng, T. Karnik, B. Liu, M. Male Ki and L. Wang, "Application-Specific Cross-Layer Optimization Based on Predictive Variable-Latency VLSI Design,".

(Continued)

*Primary Examiner* — Jack Chiang
*Assistant Examiner* — Suchin Parihar
(74) *Attorney, Agent, or Firm* — JW Law Group

(57) ABSTRACT

This invention is related to an integrated circuit optimization system and method wherein an edge-triggered sequential element such as a flip-flop is transformed into an equivalent module including level-sensitive latches of multiple phases, subsequently level-sensitive latch-based optimization techniques are applied such as level-sensitive latch retiming and better-than-worst-case design such as based on prediction and detection of signal propagation in a path through a level-sensitive latch, resulting in an integrated circuit including separate level-sensitive latches of multiple phases, edge-triggered sequential elements, and combinational logic networks.

14 Claims, 22 Drawing Sheets

(56) References Cited

U.S. PATENT DOCUMENTS

| | | | |
|---|---|---|---|
| 7,802,213 | B2 | 9/2010 | Oktem |
| 8,108,812 | B1 | 1/2012 | van Antwerpen et al. |
| 8,813,001 | B2 | 8/2014 | Zhou et al. |
| 9,875,327 | B2 | 1/2018 | Beerel et al. |
| 10,157,247 | B2 | 12/2018 | Iyer et al. |
| 2004/0216064 | A1* | 10/2004 | Gass ............ G06F 30/327 716/113 |
| 2006/0200786 | A1* | 9/2006 | Chang ........... G06F 30/3315 716/108 |
| 2009/0055786 | A1 | 2/2009 | Chang |
| 2015/0269296 | A1* | 9/2015 | Drasny ........... G06F 30/3315 716/108 |
| 2015/0324513 | A1* | 11/2015 | Teig ............. G06F 30/20 716/113 |

OTHER PUBLICATIONS

ACM Journal on Emerging Technologies in Computing Systems (J E T C)—Special Issue on Cross-Layer System Design and Regular Papers, vol. 12, Issue 3, Sep. 2015.

J. C. Monteiro, S. Devadas, A. Ghosh, Retiming sequential circuits for low power, International Journal of High Speed Electronics and Systems 07(02):398-402, 1993.

* cited by examiner

Level-Sensitive Latch $$t_{arr}(Q) = \max(t_{arr}(\phi) + d_{ck-q}, t_{arr}(D) + d_{d-q})$$

INTEGRATED CIRCUIT OPTIMIZATION SYSTEM AND METHOD BASED ON MULTI-PHASE LEVEL-SENSITIVE LATCHES

CROSS-REFERENCE TO RELATED APPLICATION

This application is based upon PCT non-provisional patent application PCT/US17/43039, entitled "Optimization System and Method for Integrated Circuits Including Multi-Phase Level-Sensitive Latches," filed on Aug. 16, 2017, which claims priority to U.S. provisional patent application U.S. 62/446,494, entitled "Multi-Phase Latch-Based Integrated Circuit Design Methods and Paradigms," filed on Jan. 15, 2017. This application is further based upon U.S. provisional patent application U.S. 62/743,248, entitled "System and Method of Optimizing Integrated Circuits based on Multi-Phase Latches," filed on Oct. 9, 2018, and U.S. provisional patent application US 62/833,127, entitled "Integrated Circuit Optimization System and Method Based on Transformation from Edge-Triggered Sequential Elements to Level-Sensitive Latches," filed on Apr. 12, 2019. The entire content of these applications is incorporated herein by reference.

BACKGROUND OF THE INVENTION

1. Field of the Invention

This invention is related to integrated circuit design optimization.

2. Brief Description of the Related Art

A synchronous integrated circuit includes sequential elements and combinational logic networks in each logic stage between sequential elements. The sequential elements are typically edge-triggered flip-flops or level-sensitive latches. A logic expression is implemented by a network of logic gates in a cell library in a process known as logic synthesis, after which optimization techniques may be applied such as logic optimization and register or latch retiming. Logic optimization applies logic transformation to find a logically equivalent implementation of the same logic function achieving specific design objectives such as timing performance. Register or latch retiming moves the structure location of an edge-triggered flip-flop or a level-sensitive latch to better balance the critical signal propagation path delays in two adjacent logic stages.

Traditional integrated circuits are based on flip-flops that require a data signal to arrive earlier than a triggering clock edge. Traditional static timing analysis verifies this by checking if the worst-case signal propagation delay across a combinational logic network is less than the clock cycle time (with further consideration of details such as setup time, hold time, clock skew, uncertainty, etc.). A level-sensitive latch has different timing requirements compared with a flip-flop. For example, a level-sensitive latch allows a data signal to arrive later than the latch enable signal that turns the latch transparent.

In static timing analysis, time borrowing occurs when a data signal arrives at a level-sensitive latch later than the latch enable signal. Such occurrence is not a timing error because the level-sensitive latch is transparent. While the borrow time or the amount of the data signal arrival time exceeding the latch enable signal arrival time needs to be compensated in subsequent signal propagation across the next logic stages which needs to complete in the subsequent clock cycles. Specifically, static timing analysis verifies this by verifying the same timing constraints for flip-flop-based synchronous integrated circuits, i.e., a signal propagation path delay needs to be less than the clock cycle time, except that the borrow time at a level-sensitive latch needs to be included in the signal propagation delay of any path originating from the level-sensitive latch. A priori art can be found in U.S. Pat. No. US 2009/0055786 A1, entitled "Method for Verifying Timing of a Circuit," filed on Aug. 5, 2008, by Mau-Chung Chang.

Integrated circuit technology scaling has led to increasingly significant parametric variations from the manufacturing process, power supply voltage, on-chip temperature, and others. As a result, the best-case or worst-case value of a parameter may not scale down proportionally with the nominal value of the parameter as technology scales. This has hindered integrated circuit performance scaling because the traditional synchronous integrated circuit design methodology requires that logic computation in a logic stage completes within a clock cycle even at the worst-case scenario. This holds for level-sensitive latch-based integrated circuits with the consideration of borrow time and compensate time.

Alternatively, better-than-worst-case integrated circuit design methodologies aim for improved performance, lower power consumption and/or smaller chip area, e.g., by not requiring logic computation to complete within a clock cycle. For example, in certain applications such as video and audio processing, a certain amount of error rate is acceptable, such that approximate computing can be applied for power, performance and area improvements. A simple approximate computing scheme is over-clocking, wherein a few timing-critical signal propagation paths have their signal propagation delays exceeding the clock cycle time, which is acceptable if the associated error rate is acceptable. Alternatively, zero error rate is ensured if the system detects and corrects or predicts and prevents every error. This may be achieved by incorporating an error-detecting/correcting code in an integrated circuit, or, with an error-detecting sequential design such as Razor. The original Razor design can be found in U.S. Pat. No. U.S. Ser. No. 10/392,382, entitled "Error Detection and Recovery Within Processing Stages of an Integrated Circuit," filed on Mar. 20, 2003, by Krisztian Flautner, Todd Michael Austin, David Theodore Blaauw, and Trevor Nigel Mudge. Other Razor-type architectures can be found in U.S. Pat. No. U.S. Ser. No. 14/702,426, entitled "Timing Violation Resilient Asynchronous Template," filed on May 1, 2015, by Peter A. Beerel, Melvin Breuer, Benmao Cheng, and Dylan Hand.

A practical timing error prediction scheme can be found in a journal article entitled "Application-Specific Cross-Layer Optimization Based on Predictive Variable-Latency VLSI Design," by V. De, A. B. Kahng, T. Karnik, B. Liu, M. Maleki and L. Wang, which appeared in ACM Journal on Emerging Technologies in Computing Systems (JETC)— Special Issue on Cross-Layer System Design and Regular Papers, Volume 12, Issue 3, September 2015, Article No. 21, on pages 21:1-21:19.

SUMMARY OF THE INVENTION

This invention is related to an integrated circuit optimization system and method wherein an edge-triggered sequential element such as a flip-flop is transformed into an equivalent module including level-sensitive latches of multiple phases, subsequently level-sensitive latch-based optimization techniques are applied such as level-sensitive latch retiming and better-than-worst-case design such as based on prediction or detection of signal propagation in a path through a level-sensitive latch, resulting in an integrated circuit including separate level-sensitive latches of multiple phases, edge-triggered sequential elements, and combinational logic networks.

In one embodiment of the invention, integrated circuit timing performance is improved by level-sensitive latch retiming or moving the structure location of a level-sensitive latch from the start or end of a timing-critical signal propagation path for reduced signal propagation path delay. Compared with the existing technique of moving the structure location of an edge-triggered flip-flop which achieves limited timing performance improvement by balancing the delays of the signal propagation paths connecting to the input and the output of the flip-flop respectively, transforming said edge-triggered flip-flop into an equivalent module including a master and a slave level-sensitive latch gives further degrees of freedom in optimizing said integrated circuit, e.g., in allowing moving the structure location of one of the level-sensitive latches for reduced delay of the signal propagation paths connecting to said level-sensitive latch without affecting any signal propagation path connecting to the other level-sensitive latch.

In one embodiment of the invention, a data signal arrival time at a level-sensitive latch from a data signal propagation path through another level-sensitive latch is compared against the arrival time of the latch disable signal that is supposed to turn said level-sensitive latch at the end of said data signal propagation path opaque immediately after said data signal arrives at said level-sensitive latch if no timing error occurs. These alternative timing constraints give further room for integrated circuit performance improvement compared with the traditional time borrowing-based timing constraints for level-sensitive latches.

Level-sensitive latch retiming leads to timing-critical signal propagation paths through level-sensitive latches, which usually have a low probability for a signal to propagate through. Excluding such rare events of having a signal propagating through such a timing-critical path in integrated circuit optimization leads to power, performance and area improvements, while handling said rare events after predicting or detecting said rare events ensures function correctness of the system. In one embodiment of the invention, signal propagation through a timing-critical path is predicted by monitoring certain side inputs of the path. In another embodiment of the invention, timing errors are detected by comparing the input and output signals of a level-sensitive latch when the latch is opaque and any preceding latch is also opaque.

DETAILED DESCRIPTION OF THE DRAWING

Advantages of the present invention will become apparent to those skilled in the art with the benefit of the following detailed description of embodiments and upon reference to the accompanying drawings in which.

Figure 3:
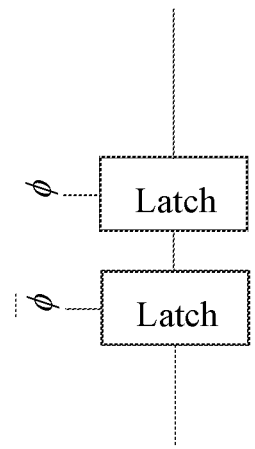
Figure 3:
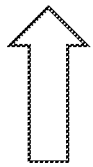
Figure 3:
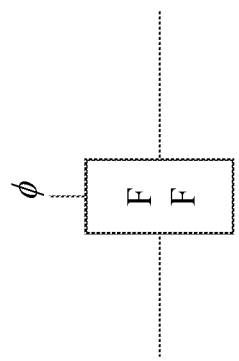

FIG. 3 gives a transformation from an edge-triggered flip-flop to a logically equivalent module consisting of level-sensitive latches which are transparent at two complementary clock phases, respectively.

Figure 4:
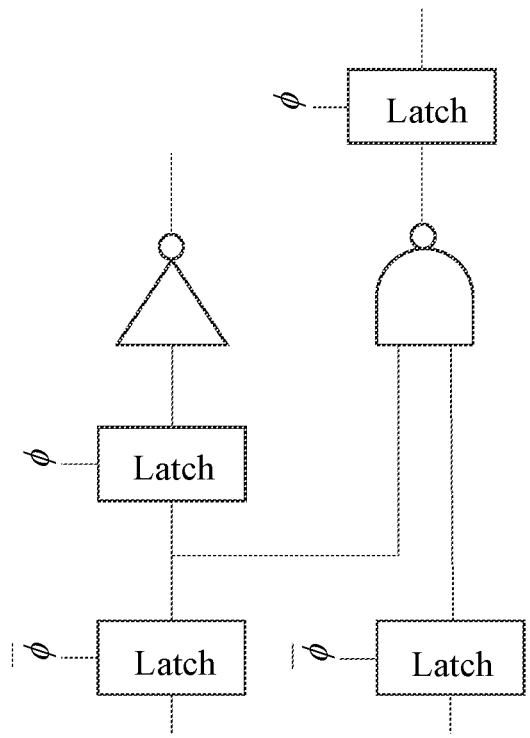
Figure 4:
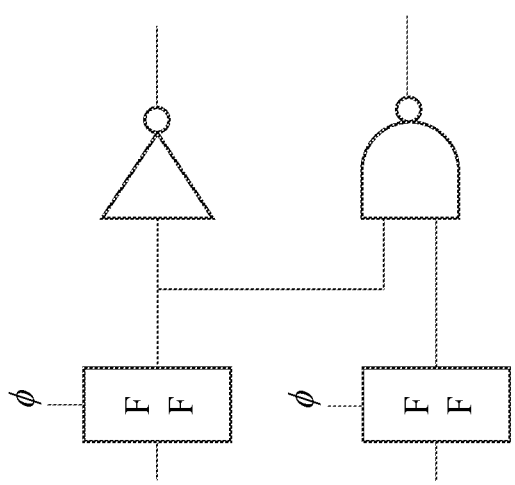

FIG. 4 illustrates sequential element transformation and level-sensitive latch relocation from the inputs of the fanin cone of a NAND gate to the outputs of the fanin cone.

Figure 5:
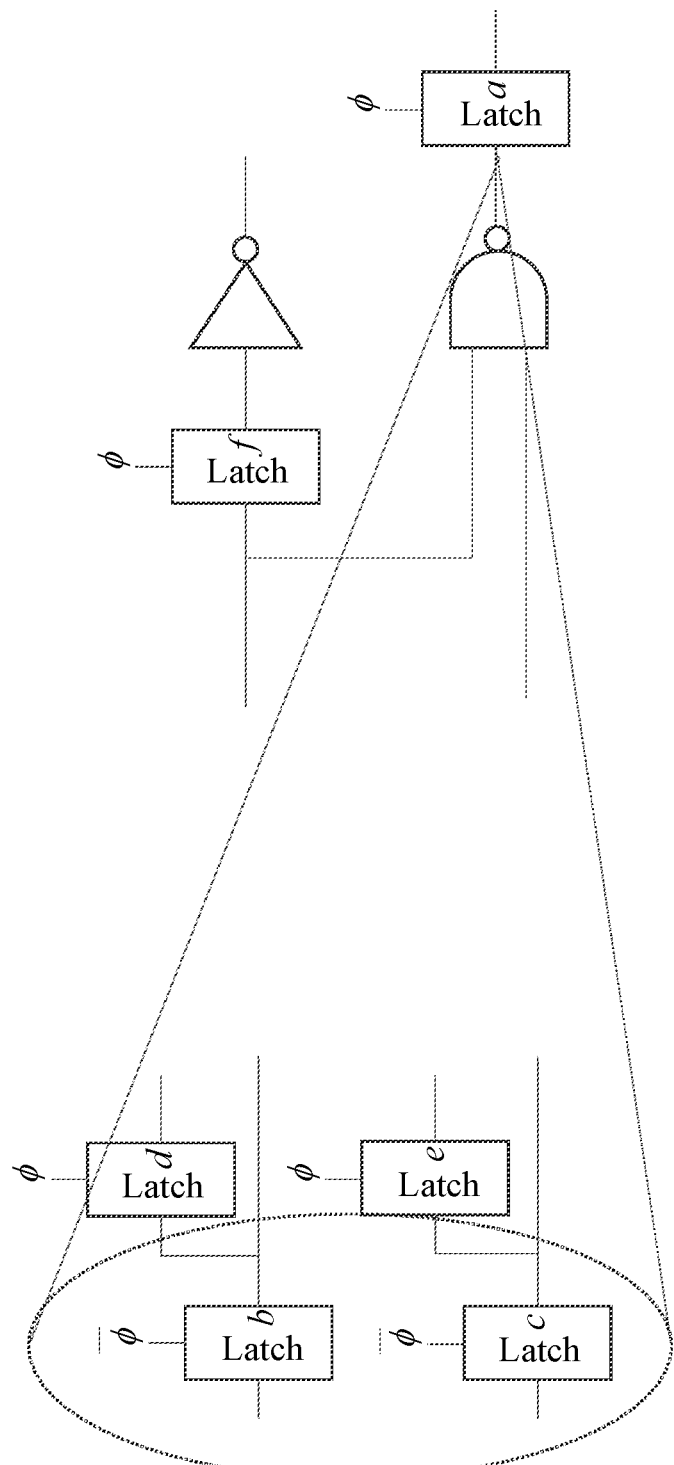

FIG. 5 illustrates level-sensitive latch insertion in a timing critical path and associated sequential element transformation and level-sensitive latch removal at the inputs of the fanin cone of the inserted latch a, and associated latch insertion at the outputs of the fanin cone.

Figure 6:
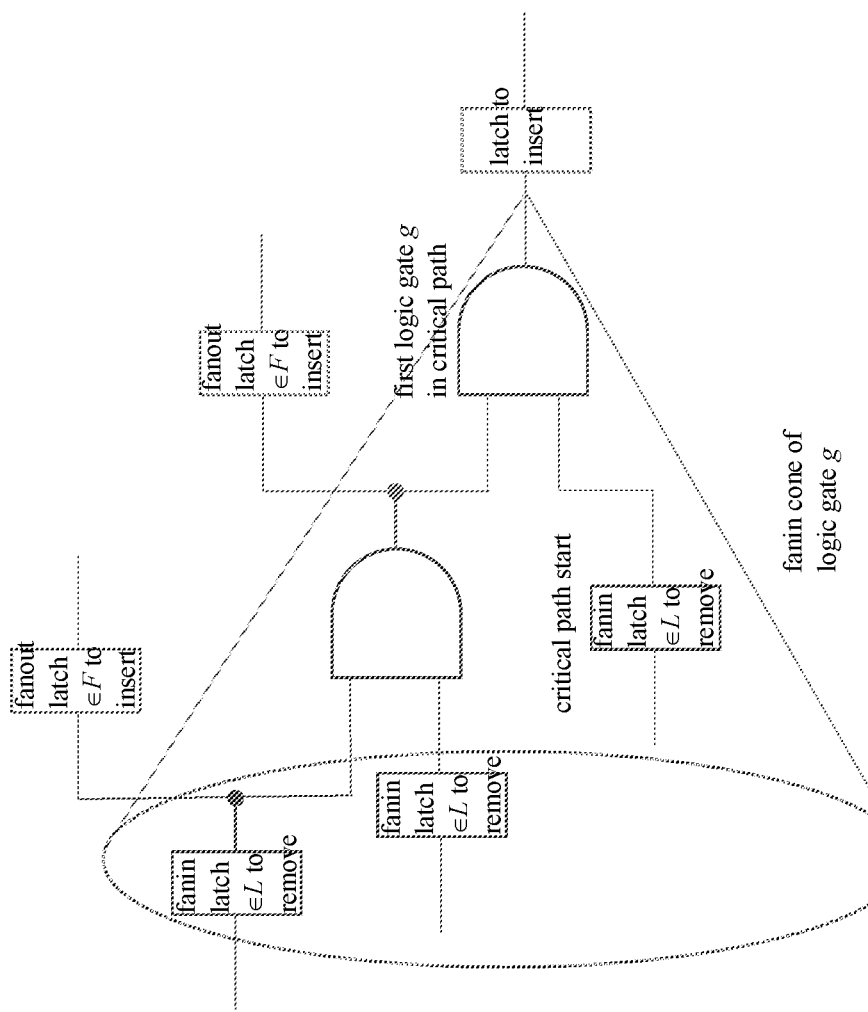

FIG. 6 illustrates level-sensitive latch removal and insertion around the start of a timing-critical path.

Figure 7:
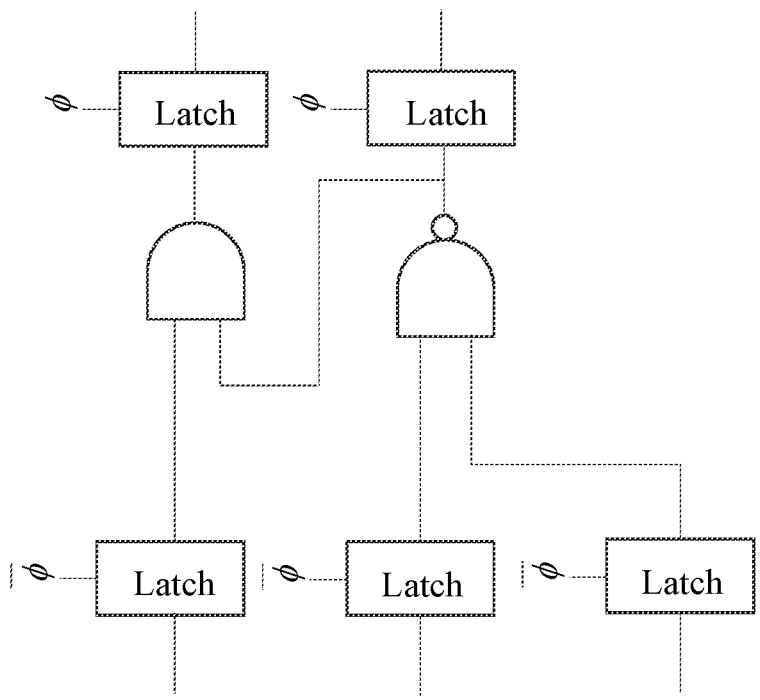
Figure 7:
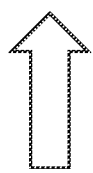
Figure 7:
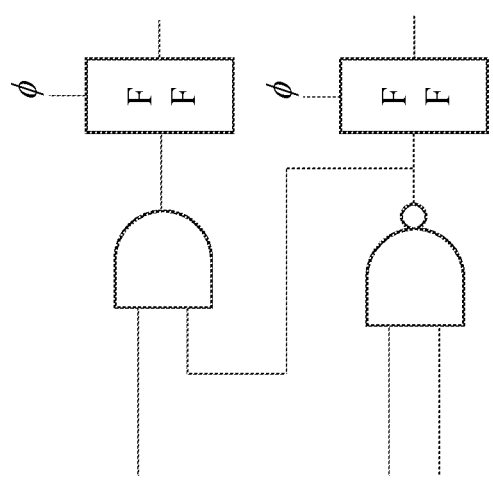

FIG. 7 illustrates sequential element transformation and level-sensitive latch relocation from the outputs of the fanout cone of a NAND gate to the inputs of the fanout cone.

Figure 8:
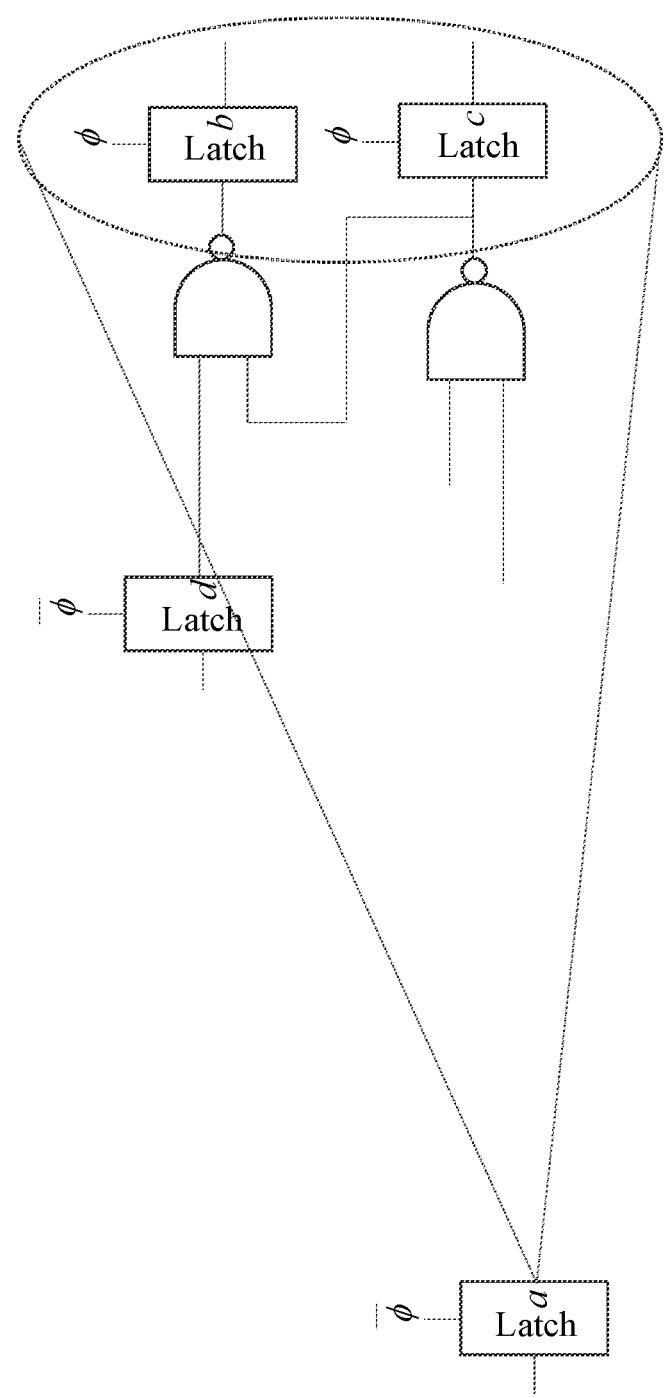

FIG. 8 illustrates level-sensitive latch insertion in a timing critical path and associated sequential element transformation and level-sensitive latch removal at the outputs of the fanout cone of the inserted latch a, and associated latch insertion at the inputs of the fanout cone.

Figure 9:
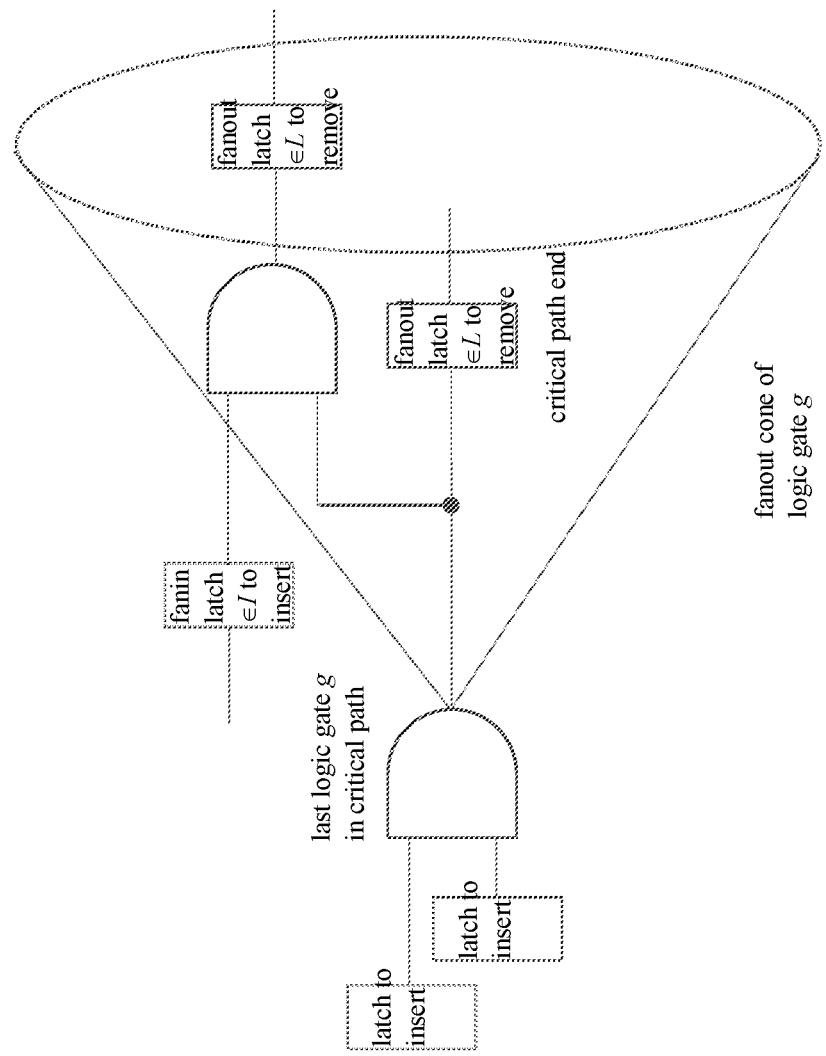

FIG. 9 illustrates level-sensitive latch removal and insertion around the end of a timing-critical path.

Figure 10:
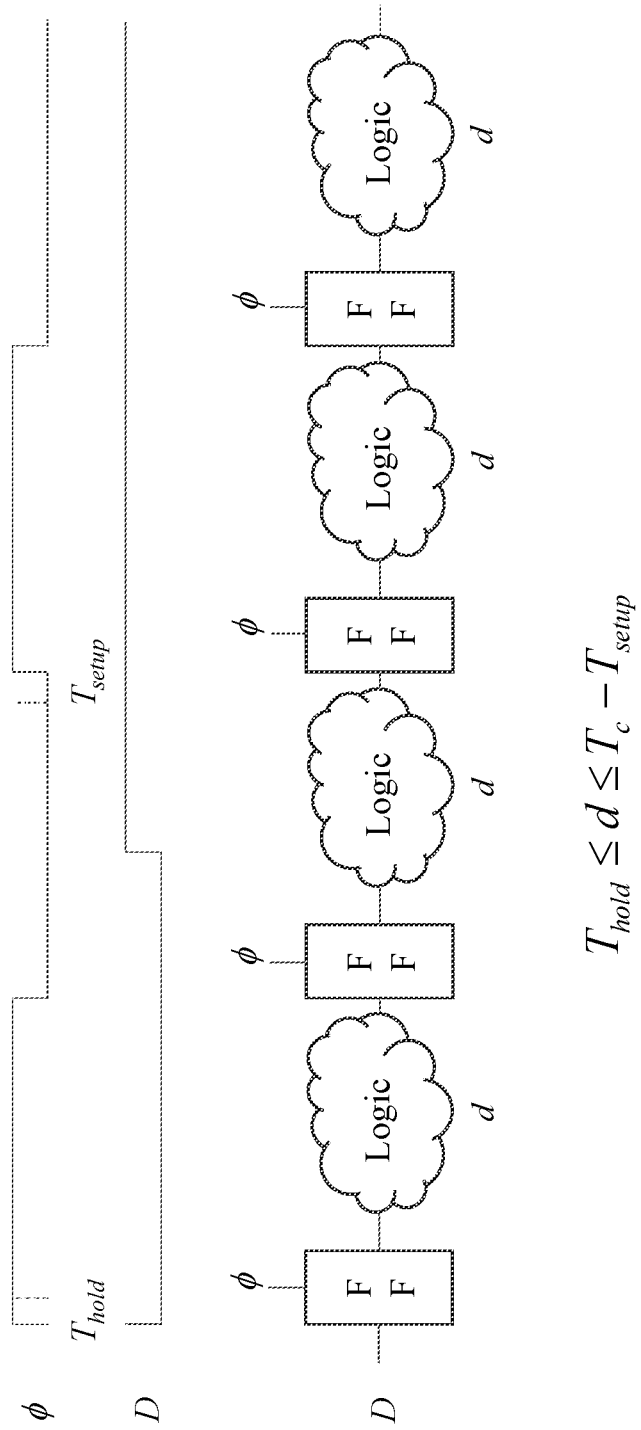

FIG. 10 illustrates the existing static timing analysis method for a synchronous digital system which constrains a signal arrival time against a setup time and a hold time. For illustration the flip-flops are triggered by a rising clock edge.

Figure 11:
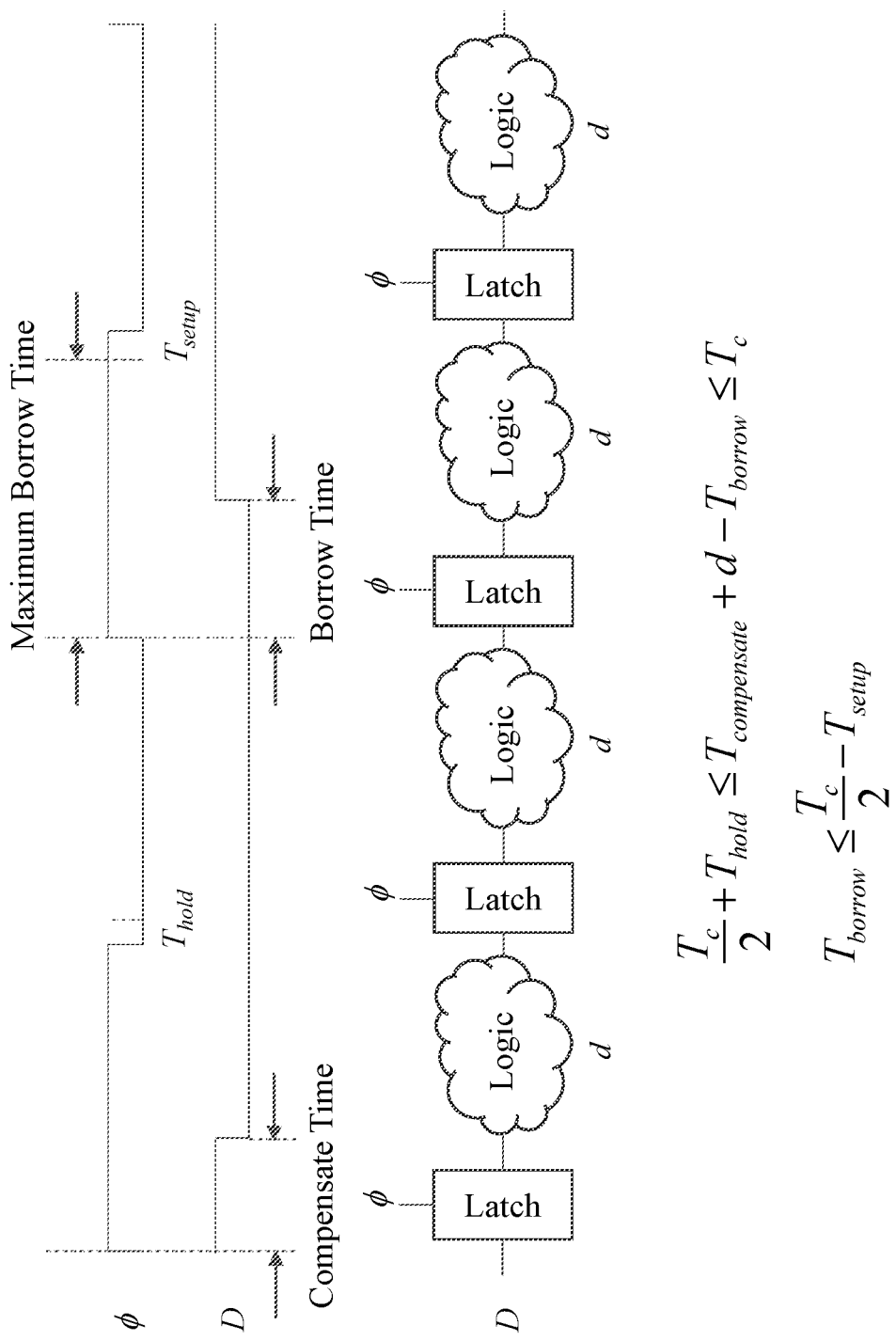

FIG. 11 illustrates the existing time borrowing method in static timing analysis, wherein the arrival time of a signal at a level-sensitive latch is adjusted by a borrow time which is any part of a signal arrival time exceeding the arrival time of an opening clock edge, while a setup time and a hold time are characterized around a closing clock edge for a level-sensitive latch, the maximum borrow time comes from the setup time constraint, and any borrow time needs to be compensated in the subsequent logic stage. For illustration the level-sensitive latches are enabled when the clock signal is high, and the clock signal is high in half of the cycle time.

Figure 12:
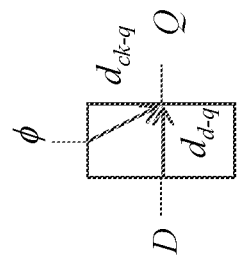

FIG. 12 illustrates signal arrival time computation at a level-sensitive latch output for setup time check in static timing analysis.

Figure 13:
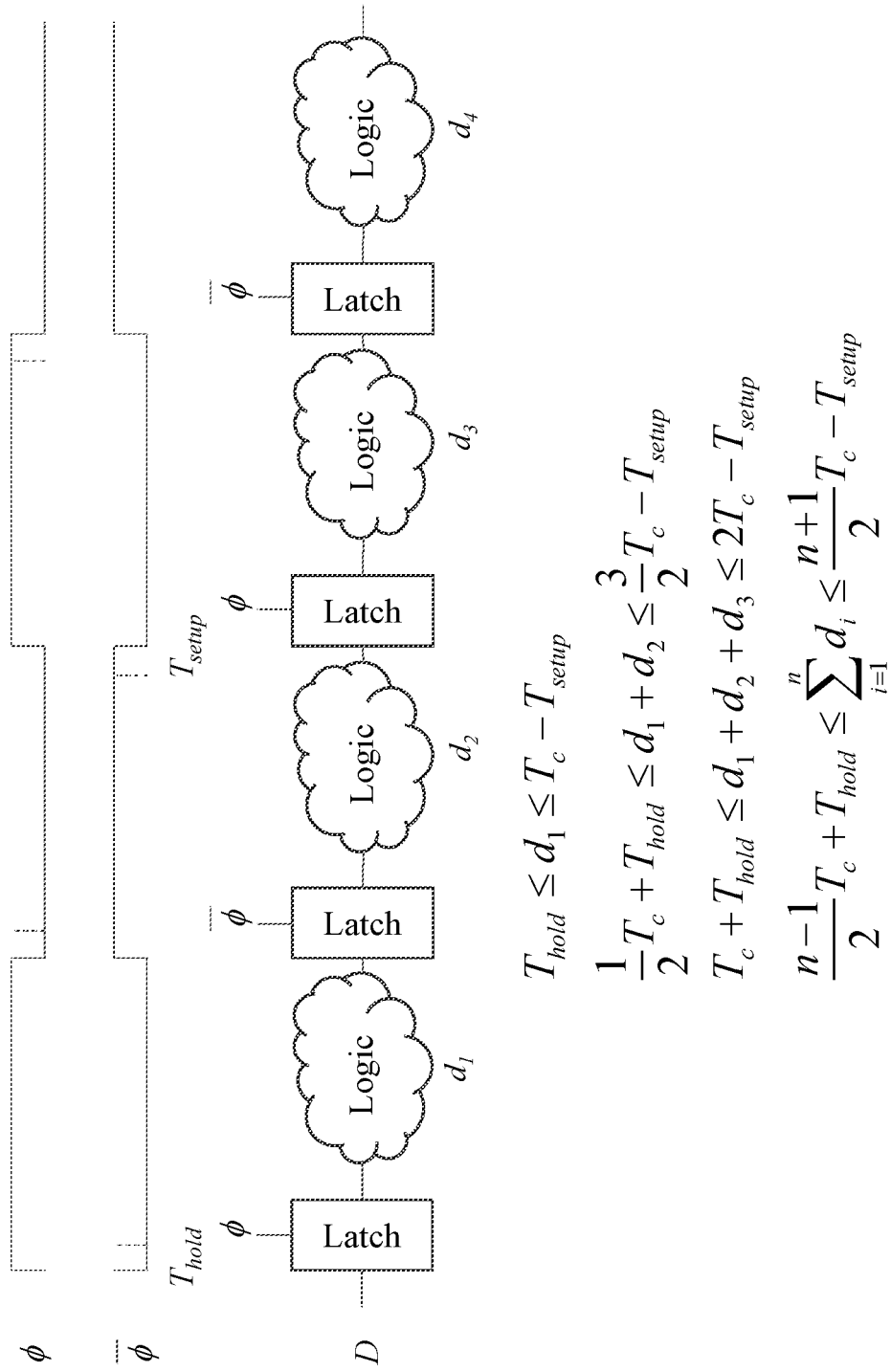

FIG. 13 illustrates a set of timing constraints for an integrated circuit including two-phase level-sensitive latches, where n is the number of logic stages that a signal propagation path crosses.

Figure 14:
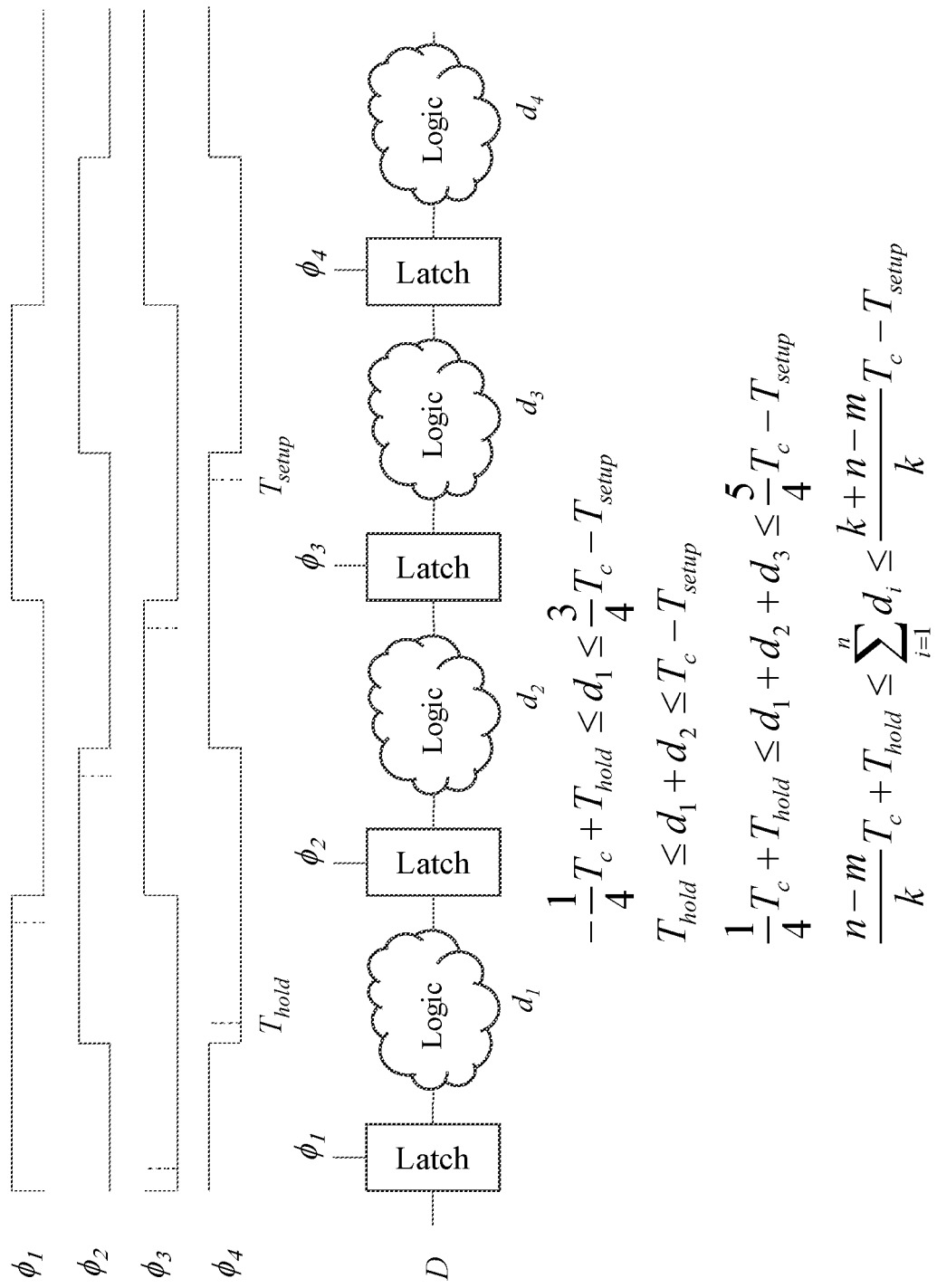

FIG. 14 illustrates a set of timing constraints for an integrated circuit including four-phase level-sensitive latches, where n is the number of logic stages that a signal propagation path crosses, k is the number of clock phases, m is the number of phases wherein a clock signal stays high.

Figure 15:
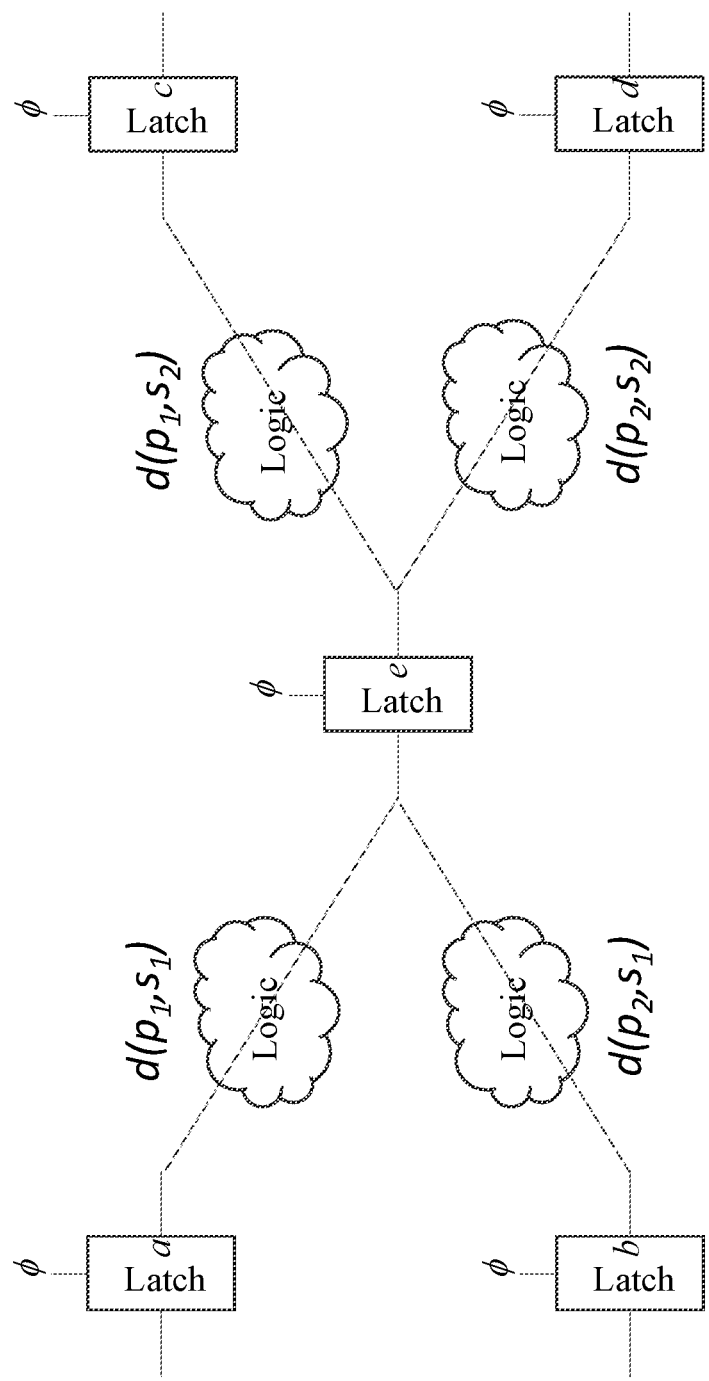

FIG. 15 illustrates a scenario wherein the traditional time borrowing-based static timing analysis method gives two timing-critical paths $p_1$ and $p_2$, while tracing signal propagation through the level-sensitive latch e at the center gives only one timing-critical path $p_1$.

Figure 16:
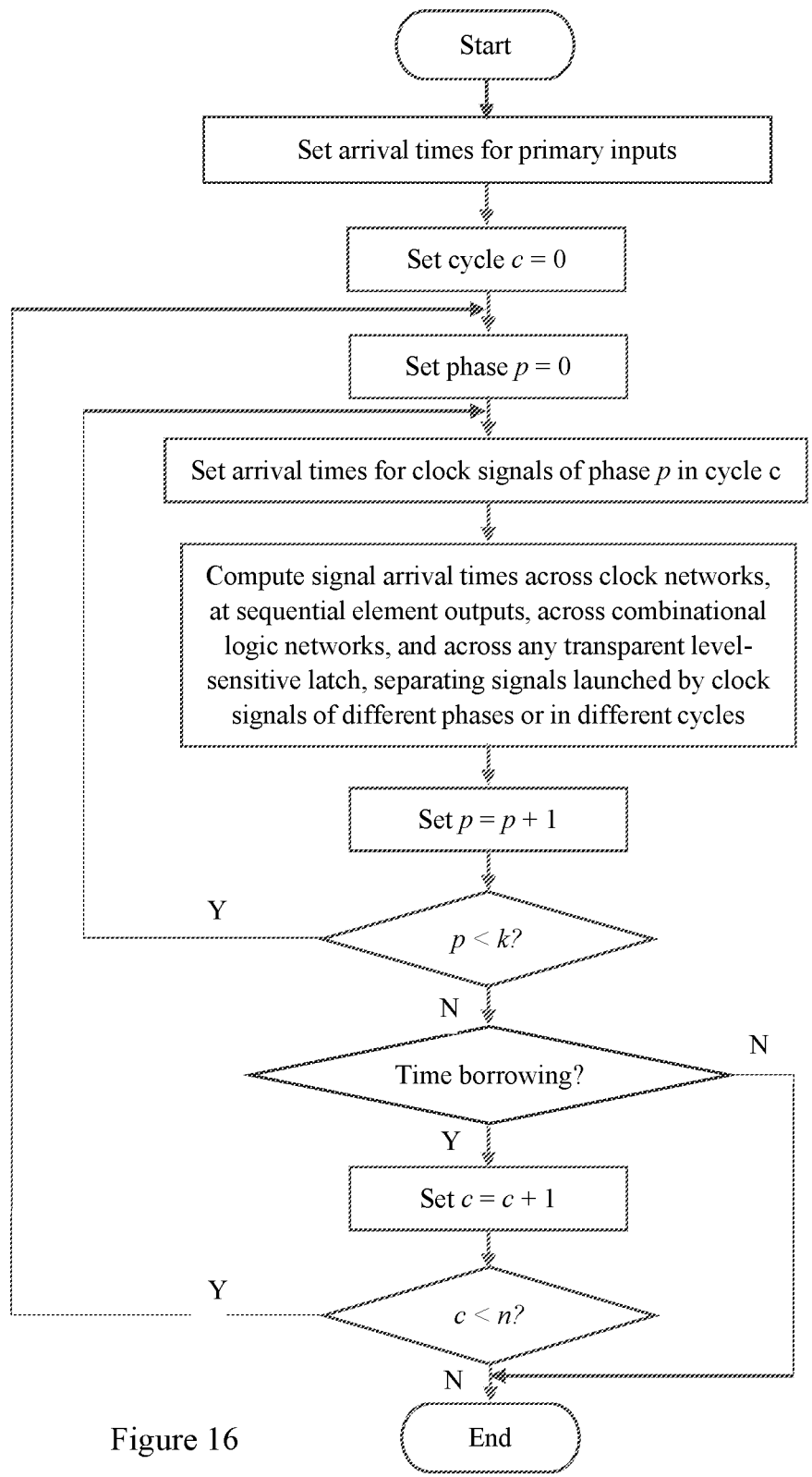

FIG. 16 illustrates a signal arrival time computation method for an integrated circuit including multi-phase level-sensitive latches, wherein after setting arrival times for primary inputs, for each clock cycle c from 0 to n, for each phase p from 0 to k, the arrival times of clock signals of phase p in cycle c are set, and subsequent signal arrival times are computed across clock networks, at sequential element outputs, and across combinational logic networks, and across any transparent level-sensitive latch.

Figure 17:
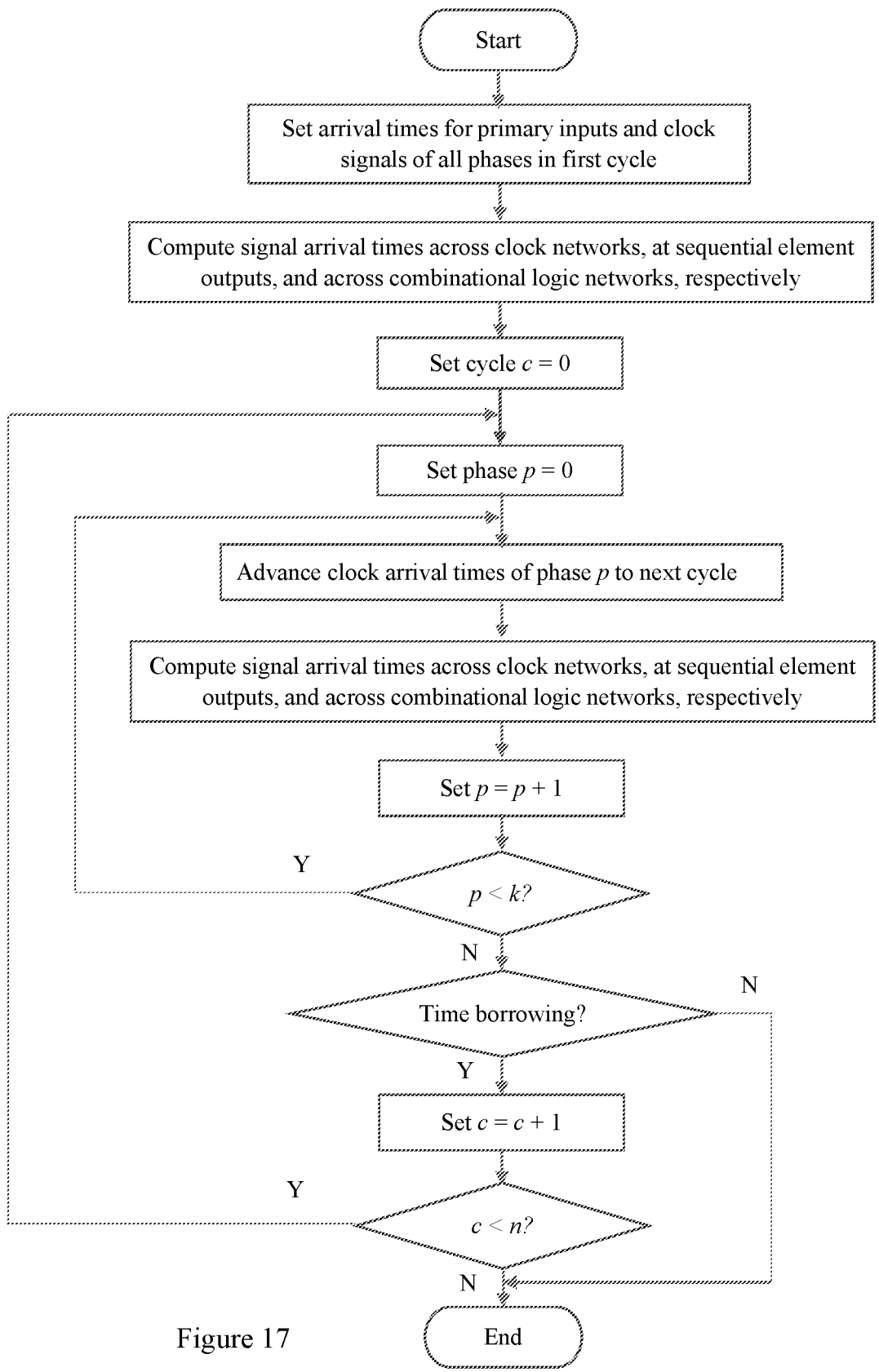

FIG. 17 illustrates a signal arrival time computation method for an integrated circuit including multi-phase level-sensitive latches, wherein after the arrival times for all primary inputs and clock signals of all phases in the first cycle are set, signal arrival times are computed across clock networks, at sequential element outputs, and across combinational logic networks, respectively; subsequently for each clock cycle c from 0 to n, for each phase p from 0 to k, the arrival times of clock signals of phase p in cycle c advance to the next cycle, and subsequent signal arrival times are computed across clock networks, at sequential element outputs, and across combinational logic networks, respectively.

Figure 18:
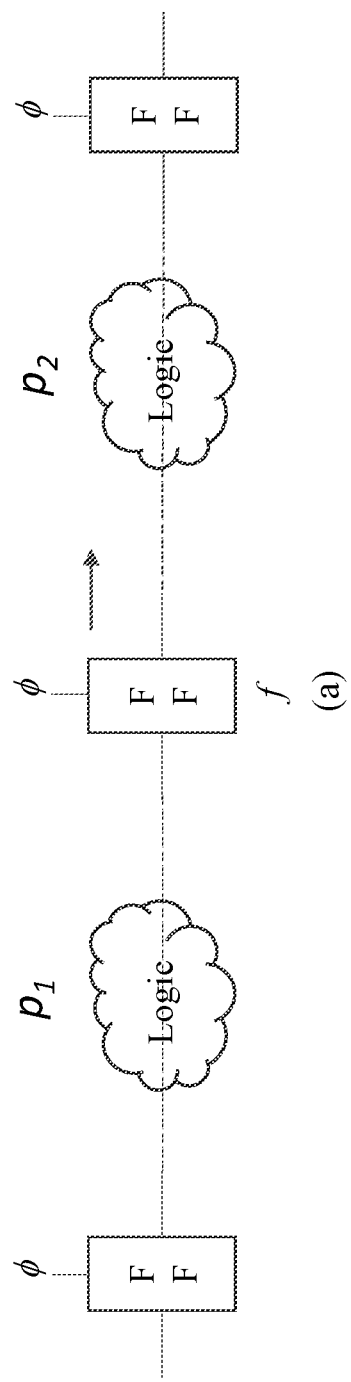
Figure 18:
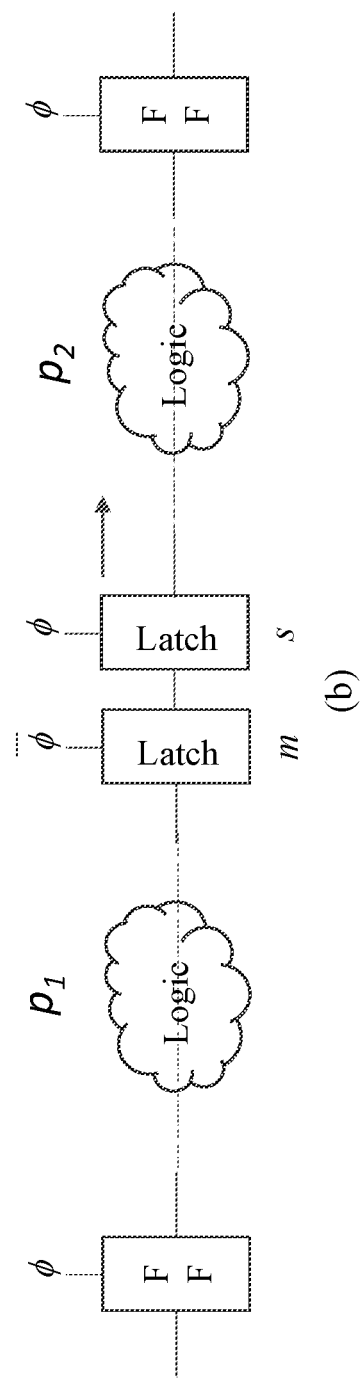

FIG. 18 illustrates a scenario wherein (a) moving the structure location of the flip-flop f at the center does not lead to performance improvement of the circuit because it cannot balance the delays of signal propagation paths $p_1$ and $p_2$ any better; while (b) after transforming the flip-flop f at the center into a pair of master and slave level-sensitive latches m and s, moving the slave latch s reduces the delay of the signal propagation path $p_2$ that starts at the slave latch s without affecting any signal propagation path such as $p_1$ ending at the master latch m.

Figure 19:
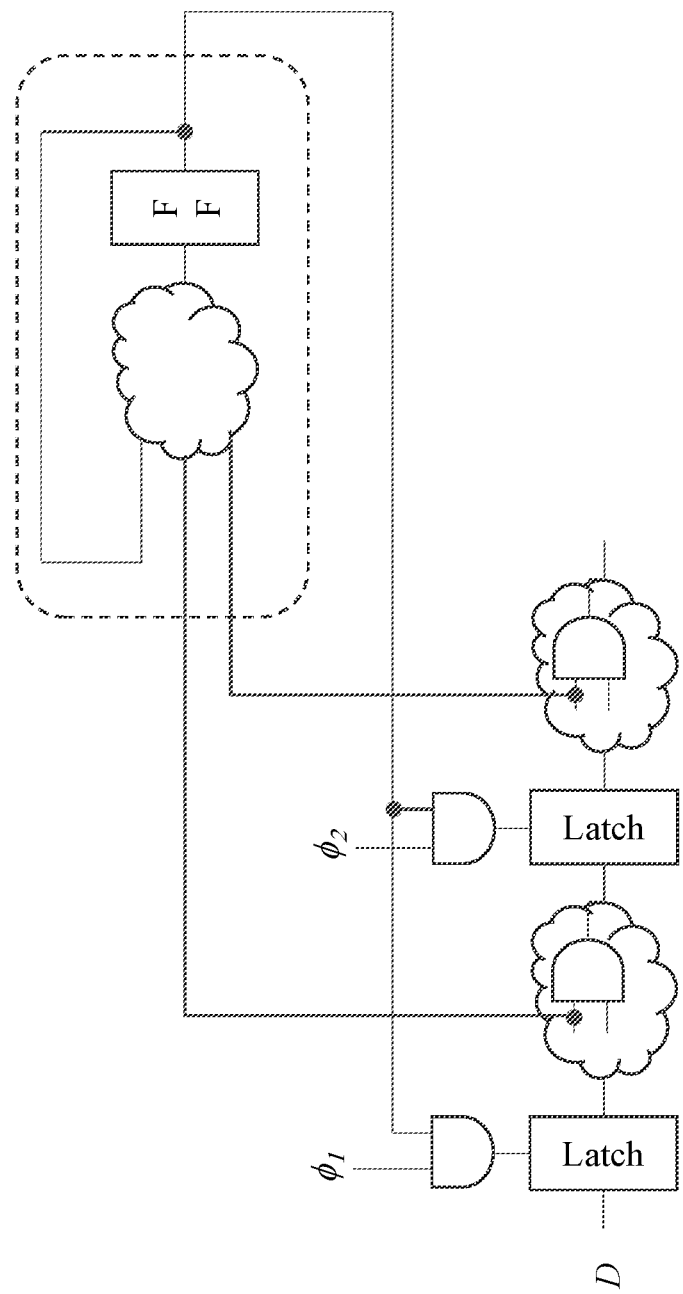

FIG. 19 illustrates a timing error predicting apparatus in the form of a finite state machine that predicts an upcoming timing error by sampling signals from different logic stages in an integrated circuit including multi-phase level-sensitive latches.

Figure 20:
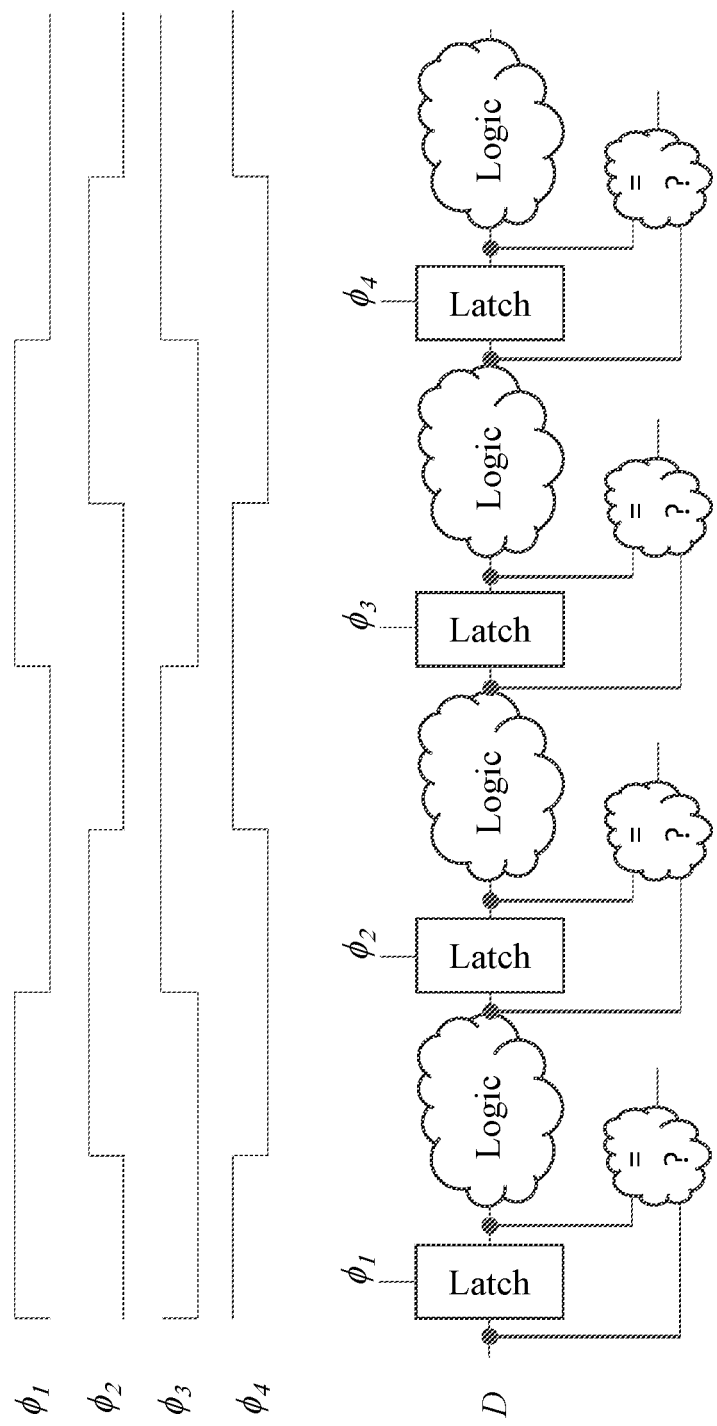

FIG. 20 illustrates a timing error detecting apparatus which compares the input and output signals of a level-sensitive latch when said level-sensitive latch is opaque and any preceding level-sensitive latch is also opaque in an integrated circuit including multi-phase level-sensitive latches.

Figure 21:
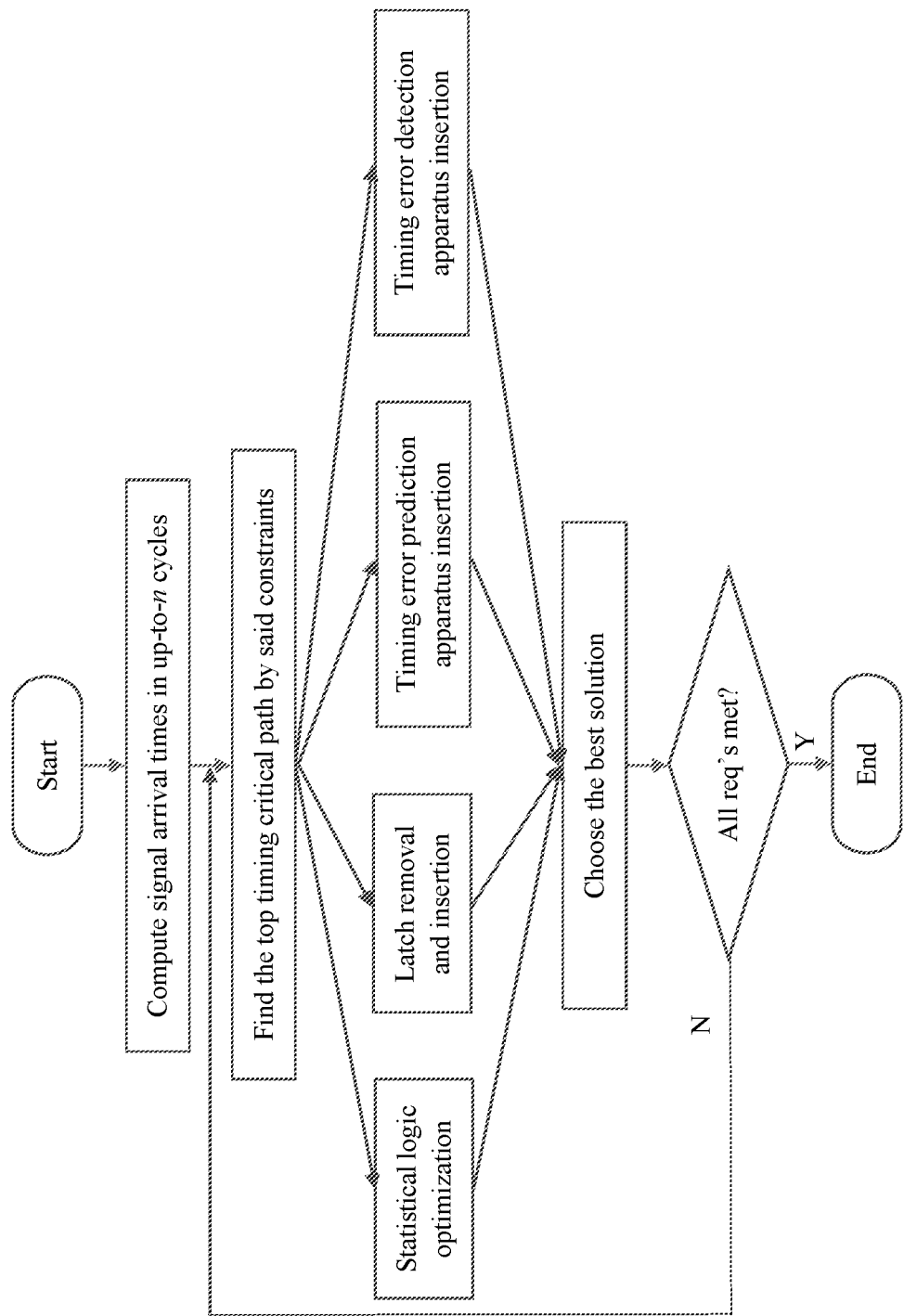

FIG. 21 illustrates a method of optimizing an integrated circuit including multi-phase level-sensitive latches comprising the step of statistical logic optimization, latch removal and insertion, timing error prediction apparatus insertion, or timing error detection apparatus insertion for each timing critical path in an iteration.

Figure 22:
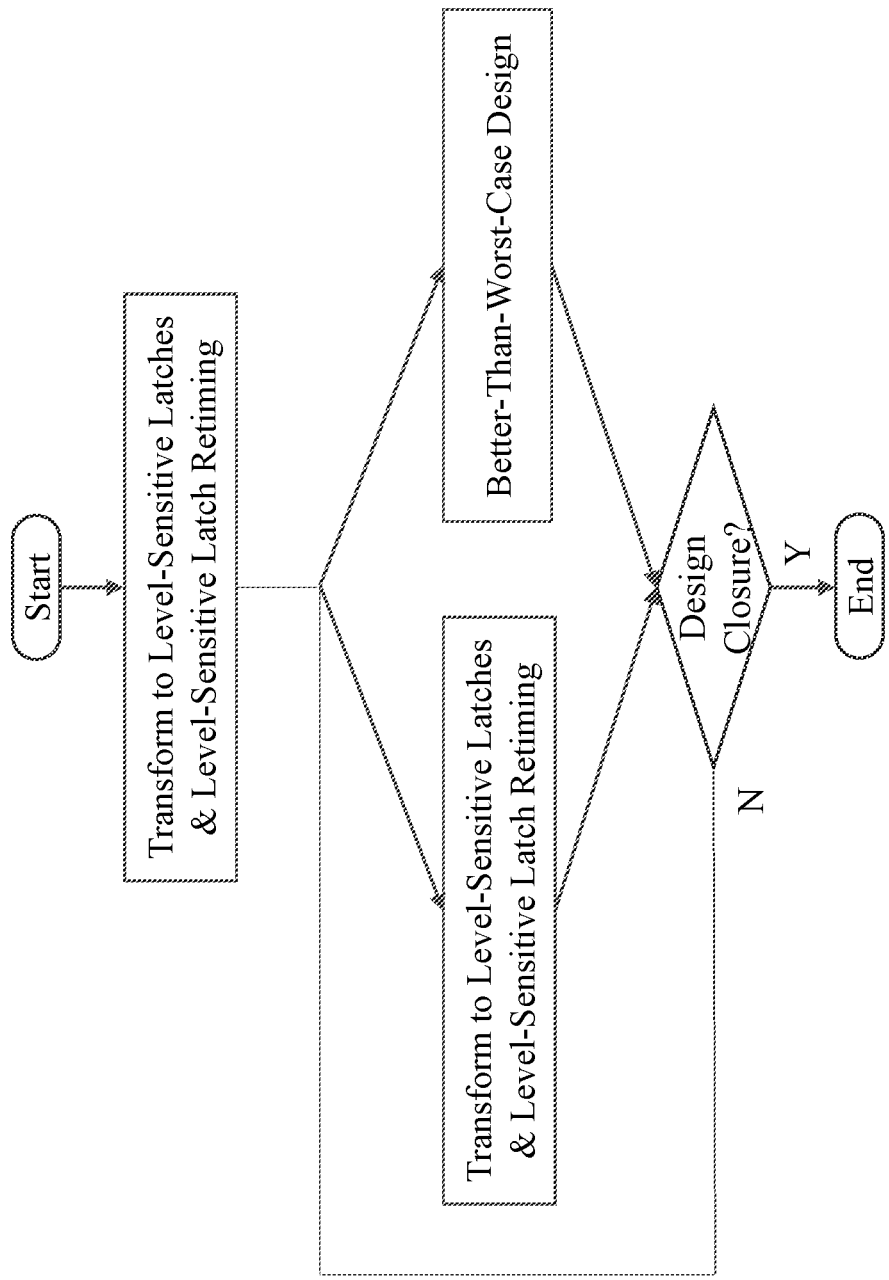

FIG. 22 illustrates an integrated circuit optimization method comprising the steps of transforming an edge-triggered sequential element to an equivalent module including multi-phase level-sensitive latches, level-sensitive latch retiming, and any further transformation to level-sensitive latches, level-sensitive latch retiming and better-than-worst-case design techniques.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE ILLUSTRATIVE EMBODIMENT

It is to be understood that the present invention is not limited to particular devices or systems, which may, of course, vary. It is also to be understood that the terminology used herein is for the purpose of describing particular embodiments only, and is not intended to be limiting. As used in this specification and the appended claims, the singular forms "a", "an", and "the" includes singular and plural references unless the content clearly dictates otherwise.

Figure 1:
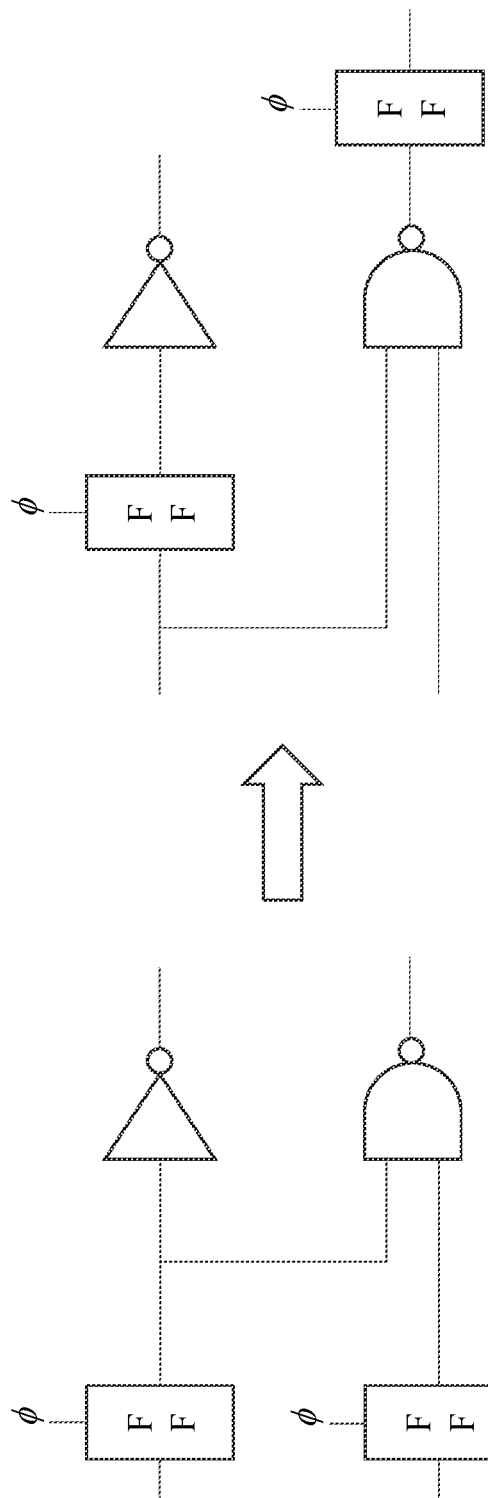
FIG. 1 illustrates the traditional flip-flop retiming technique.
Figure 2:
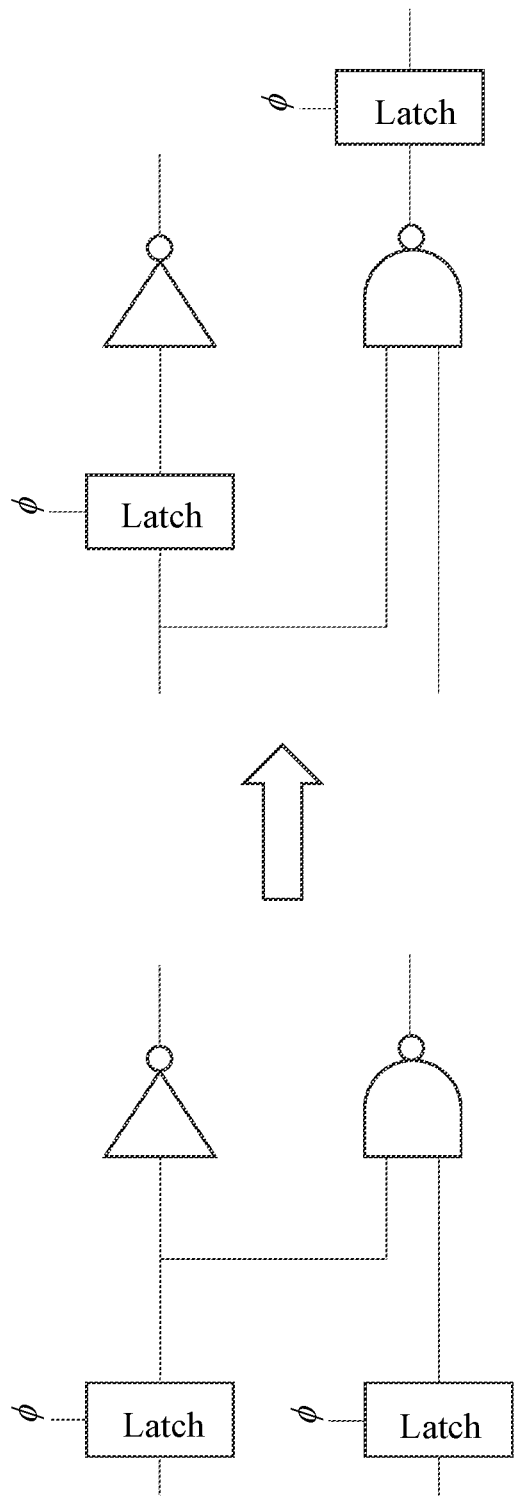
FIG. 2 illustrates the traditional level-sensitive latch retiming technique.

FIG. 1 illustrates the traditional flip-flop retiming technique. Timing performance is improved by better balancing the delays of the signal propagation paths ending and starting at the flip-flops. Similarly, FIG. 2 illustrates the traditional level-sensitive latch retiming technique. Timing performance is improved by better balancing the delays of the signal propagation paths ending and starting at the level-sensitive latches.

FIG. 3 illustrates transformation from an edge-triggered sequential element to an equivalent module including multi-phase level-sensitive latches. Specifically, a D flip-flop is transformed to a master latch and a slave latch which are transparent in two complementary clock phases, respectively. Similar transformations to an equivalent module including multi-phase level-sensitive latches can be performed for more complex edge-triggered sequential elements.

FIG. 4 illustrates two edge-triggered flip-flops which are transformed to level-sensitive latches and subsequently two level-sensitive latches are removed from the inputs of the NAND gate, a new level-sensitive latch is inserted at the output of the NAND gate, while another level-sensitive latch is inserted at the fanout node of the fanin cone of the NAND gate which is at the input of the inverter.

FIG. 5 illustrates an integrated circuit optimization method that is enabled by transformation from edge-triggered sequential elements to level-sensitive latches. First, a timing-critical path is identified that needs to be shortened, e.g., for a setup timing constraint. Second, an edge-triggered flip-flop at the start of the timing-critical path is transformed to an equivalent module including level-sensitive latches. Next, a level-sensitive latch is relocated from the start of the path to a new location in the path. The new location is determined such that (1) the timing constraints are met, and (2) the cost such as chip area and/or power consumption is minimized. Subsequently, traversing the gate-level network from the inserted level-sensitive latch (a in FIG. 5) gives the fanin cone of the inserted latch. At the inputs of the fanin cone are a group of sequential elements. Any edge-triggered sequential element at an input of the fanin cone needs to be transformed to an equivalent module including level-sensitive latches (including level-sensitive latches b and c in FIG. 5). Subsequently a level-sensitive latch is removed at each input of the fanin cone. Further, a level-sensitive latch needs to be inserted at each fanout node of the fanin cone (including d, e, and f in FIG. 5), such that no signal propagation path goes through two level-sensitive latches consecutively which are transparent at the same time, even after transforming an edge-triggered sequential element to an equivalent module including level-sensitive latches.

FIG. 6 illustrates a special case of optimizing an integrated circuit including multi-phase level-sensitive latches, wherein a level-sensitive latch at the start of a timing-critical path is moved from an input of a logic gate g to an output of the logic gate g. To keep the sequence of level-sensitive latches in any signal propagation path controlled by the same sequence of clock signals of the same phases, respectively, one needs to remove all the level-sensitive latches/in the fanin cone of the logic gate g which may send a signal to the logic gate g without crossing any other sequential element, and inserts a level-sensitive latch controlled by the same clock signal of the same phase as the removed level-sensitive latches at the output of the logic gate g and at any fanout/from which a signal may propagate to other logic gates out of the fanin cone.

FIG. 7 illustrates two edge-triggered flip-flops which are transformed into level-sensitive latches and subsequently two level-sensitive latches are removed from the outputs of the fanout cone of the NAND gates, two new level-sensitive latches are inserted at the inputs of the NAND gate, while another level-sensitive latch is inserted at an fanin node of the fanout cone of the NAND gate which is at an input of the AND gate.

FIG. 8 illustrates an integrated circuit optimization method that is enabled by transformation from edge-triggered sequential elements to level-sensitive latches. First, a timing-critical path is identified that needs to be shortened, e.g., for a setup timing constraint. Second, an edge-triggered flip-flop at the end of the timing-critical path is transformed to an equivalent module including level-sensitive latches. Next, a level-sensitive latch is relocated from the end of the path to a new location in the path. The new location is determined such that (1) the timing constraints are met, and (2) the cost such as chip area and/or power consumption is minimized. Subsequently, traversing the gate-level network from the inserted level-sensitive latch (a) gives the fanout cone of the inserted latch. At the outputs of the fanout cone are a group of sequential elements. Any edge-triggered sequential element at an output of the fanout cone needs to be transformed to an equivalent module including level-sensitive latches (including b and c). Subsequently a level-sensitive latch is removed at each output of the fanout cone. Further, a level-sensitive latch needs to be inserted at each fanin node of the fanout cone (including d), such that no signal propagation path goes through two level-sensitive latches consecutively which are transparent at the same time, even after transforming an edge-triggered sequential element into an equivalent module including level-sensitive latches.

FIG. 9 illustrates a special case of optimizing an integrated circuit including multi-phase level-sensitive latches wherein a timing-critical signal propagation path is shortened by moving a level-sensitive latch from the output of a logic gate g at the end of the path to an input of the logic gate g. To keep the sequence of level-sensitive latches in any signal propagation path controlled by the same sequence of clock signals of the same phases, respectively, one needs to remove all the level-sensitive latches L in the fanout cone of the logic gate g which the logic gate g may send a signal to without crossing any other sequential element, and inserts level-sensitive latches controlled by the same clock signals of the same phase as the removed latches at the inputs of the logic gate g and any side input/from which a signal may propagate to a logic gate in the fanout cone.

An integrated circuit is subject to timing constraints. FIG. 10 gives the setup and hold timing constraints for a traditional flip-flop-based synchronous integrated circuit, wherein dis signal propagation delay in a logic stage, $T_c$ is the clock cycle time, $T_{hold}$ is the hold time constraint, and $T_{setup}$ is the setup time constraint. In the traditional static timing analysis method, gate and interconnect delays are accumulated in each logic stage, the resultant signal propagation path delays are compared against the setup and the hold time constraints of a receiving flip-flop.

FIG. 11 gives the setup and hold timing constraints for a single-phase level-sensitive latch-based integrated circuit wherein a signal propagates through a series of level-sensitive latches which are clocked by clock signals of a single phase. d is signal propagation delay in a logic stage, $T_c$ is the clock cycle time, $T_{hold}$ is the hold time constraint, $T_{setup}$ is the setup time constraint. For illustration, the level-sensitive latches are transparent when the clock signal φ is high, and the clock signal is high in half of the clock cycle. For each level-sensitive latch, a setup time and a hold time are characterized relative to a latch disable signal or a closing clock edge, which are the minimum amount of time that a data signal must be held steady before and after the latch disable signal or the closing clock edge, respectively. Time borrowing occurs when a signal arrives at a data pin of a level-sensitive latch after a latch enable signal or an opening clock edge. The borrow time $T_{borrow}$ is the part of the data signal arrival time exceeding the latch enable signal or opening clock signal arrival time. The maximum borrow time is the difference between the latch enable signal arrival time and the latch disable signal arrival time or the opening clock edge arrival time and the closing clock edge arrival time excluding the setup time. The compensation time $T_{compensate}$ is the borrow time of the signal at the input of the launch latch or the output of the preceding logic stage. In the traditional static timing analysis, gate and interconnect delays are accumulated in each logic stage. The latest data signal arrival time at a receiving level-sensitive latch from all possible paths is used to calculate the borrow time or compensate time at a level-sensitive latch. For a signal propagation path starting from a level-sensitive latch and ending at an edge-triggered flip-flop, the path delay is checked against the setup and hold time constraints for a signal arriving at the edge-triggered flip-flop which are the same as in FIG. 10, except that any compensation time of the launch level-sensitive latch needs to be included in the signal propagation path delay.

FIG. 12 gives that, in static timing analysis, for setup time check, the worst-case signal arrival time at a level-sensitive latch output is given by the maximum of (1) the signal arrival time at a data input pin plus the signal propagation delay da-q from the data input pin to the output pin, and (2) the arrival time of a clock signal Ø that turns the latch transparent plus the clock signal propagation delay $d_{ck-q}$ from the enable pin to the output pin.

In a multi-phase latch-based integrated circuit, a signal may propagate through a sequence of level-sensitive latches which are enabled by a group of clock signals of multiple phases. In a typical design, once a clock signal turns a latch transparent, a signal propagates through it (usually across a combinational logic network) and reaches another latch that turns transparent at a subsequent clock phase. If the signal arrives before the receiving latch turns transparent, the signal waits before its subsequent propagation. If the signal arrives after the receiving latch turns transparent and while the receiving latch is transparent, i.e., time borrowing occurs, the signal continues propagate across the next combinational logic stage. If the signal arrives after the receiving latch turns transparent at a subsequent clock phase and then opaque, the signal cannot propagate through the receiving latch. It must wait for one more clock cycle to propagate through the receiving latch, in the meantime it may be destroyed by the logic computation in the subsequent clock cycle, causing a logic error.

Consequently, a signal is required to arrive at a receiving level-sensitive latch before it turns opaque. The setup time characterizes the minimum allowable duration between a data signal arrival time at a level-sensitive latch and the arrival time of a clock edge that turns the level-sensitive latch opaque. Further, a data signal must remain stable after a clock edge that turns a level-sensitive latch opaque. The hold time characterizes the minimum amount of time that a data signal must remain stable after a clock edge that turns a level-sensitive latch opaque.

FIG. 13 gives the setup and hold timing constraints for a two-phase level-sensitive latch-based integrated circuit wherein a signal propagates through a series of level-sensitive latches which are alternatively clocked by clock signals of complementary phases. $d_i$ is the signal propagation delay in the i-th logic stage, $T_c$ is the clock cycle time, $T_{hold}$ is the hold time constraint, and $T_{setup}$ is the setup time constraint.

FIG. 14 gives the setup and hold timing constraints for a four-phase level-sensitive latch-based integrated circuit wherein a signal propagates through a series of level-sensitive latches which are alternatively clocked by clock signals of four different phases. For illustration, the clock signals of four different phases rise at 0, 25%, 50% and 75% of a clock cycle, and fall at 50%, 75%, 100% and 25% of a clock cycle, respectively. $d_i$ is the signal propagation delay in the i-th logic stage, $T_c$ is the clock cycle time, $T_{hold}$ is the hold time constraint, and $T_{setup}$ is the setup time constraint. Along any data signal propagation path, the level-sensitive latches turn transparent subsequently: after a level-sensitive latch turns transparent, a data signal propagates from it across a logic network, while at the output of the logic network a receiving level-sensitive latch turns transparent in a subsequent clock phase. Each level-sensitive latch is transparent for two consecutive clock phases and opaque for two consecutive clock phases. The signal propagation delay across the first logic stage must be smaller than the duration of three clock phases excluding the setup time of the receiving level-sensitive latch, allowing the signal to set up before the receiving level-sensitive latch turns opaque; it further must be larger than the hold time at the receiving level-sensitive latch excluding the duration of one clock phase, allowing the previous signal to hold after the receiving level-sensitive latch turns opaque. Such a hold time constraint is usually easily met as it requires the signal propagation delay be larger than a negative amount. While any clock skew and/or uncertainty needs to be included.

FIG. 14 further gives the setup and hold timing constraints in a generic multi-phase level-sensitive latch-based integrated circuit wherein a signal propagates through a series of level-sensitive latches which are controlled by clock signals of consecutive phases. In general, let k be the number of clock phases, m be the number of clock phases wherein a level-sensitive latch is opaque, and n be the number of logic stages that a data propagation path crosses, the setup and hold timing constraints in a multi-phase level-sensitive latch-based integrated circuit can be found in FIG. 14. Specifically, as n increases by one, the maximum and minimum allowable data propagation path delay across n logic stages increase by the duration of a clock phase, respectively. This holds for a multi-phase level-sensitive latch-based circuit wherein a signal propagates through a sequence of level-sensitive latches which are controlled by clock signals of consecutive phases. It is possible that some clock phase is missing for a series of level-sensitive latches in a signal propagation path. More generally speaking, the setup time constraint for a signal arriving at a level-sensitive latch is given by the subsequent clock signal that turns the latch opaque, while the hold time constraint is given by the previous clock signal that turns the latch opaque. This also applies to flip-flops which consist of level-sensitive latches.

The timing constraints in FIG. 13 or 14 are more relaxed than the traditional time borrowing-based timing constraints in FIG. 11 for a signal propagation path across a small number n of logic stages, giving further room for integrated circuit performance improvement. As n increases, the gap between the timing constraints in FIG. 13 or 14 and the timing constraints in FIG. 11 decreases. While in practice of static timing analysis, n is a small number in most cases and never goes to infinity. This is because: (1) Signal propagation is only traced through a level-sensitive latch if the data signal arrives later than the enable signal that turns the level-sensitive latch transparent; otherwise the signal arrival time at the output of the level-sensitive latch is determined by the arrival time of the enable signal that turns the level-sensitive latch transparent. (2) Taking parametric variations into account, without perfect correlation, the cancelling effect which decreases the signal propagation path delay increases as the path grows longer, such that the worst negative slack is from a signal propagation path of a finite length, except in certain circumstances wherein the worst negative slack does come from a signal propagation path of infinite length such as a loop, which needs to be taken care of in timing analysis. Timing analysis does not need to trace a signal propagation path through an infinite number of logic stages because, as n the number of logic stages increases, each logic stage's contribution to any negative slack decreases, such that at some point, signal arrival time computation stops with sufficient accuracy.

Tracing a signal propagation path through a level-sensitive latch gives further room for integrated circuit performance improvement compared with the traditional time borrowing-based approach, wherein a signal propagation path does not go through a level-sensitive latch, and the maximum signal arrival time at a level-sensitive latch gives the borrow time or the compensate time for all the paths starting from the level-sensitive latch. In FIG. 15, a borrow time-based approach gives two timing-critical paths ($p_1$ and $p_2$), while tracing signal propagation through the level-sensitive latch e gives only one timing-critical path ($p_1$). Let us denote signal propagation path $p_1$'s delay in logic stage $s_1$ as $d(p_1,s_1)$, $p_1$'s delay in logic stage $s_2$ as $d(p_1,s_2)$, $p_2$'s delay in logic stage $s_1$ as $d(p_2, s_1)$, $p_2$'s delay in logic stage $s_2$ as $d(p_2,s_2)$. For illustration, let us have $d(p_1, s_1)$ $d(p_2, s_1)$; $T_{compensate}=0$ at the start of $p_1$ and $p_2$; and $T_{borrow}=0$ at the end of $p_1$ and $p_2$. Further ignore other delay components such as signal propagation delay through a latch, clock skew, setup time, hold time, etc.

In the traditional time borrowing-based static timing analysis method, we have $$T_{borrow} = d(p_1, s_1) - T_c$$
$$d(p_1, s_1) \le T_c + T_{borrow}$$
$$d(p_2, s_1) \le T_c + T_{borrow}$$
$$T_{borrow} + d(p_1, s_2) \le T_c$$
$$T_{borrow} + d(p_1, s_2) \le T_c$$

which are equivalent to $$d(p_1, s_1) + d(p_1, s_2) \le 2T_c \qquad (1)$$
$$d(p_1, s_1) + d(p_2, s_2) \le 2T_c$$

While the new timing constraints as shown in FIG. 9 are $$d(p_1, s_1) + d(p_1, s_2) \le 2T_c \qquad (2)$$
$$d(p_2, s_1) + d(p_2, s_2) \le 2T_c$$

which are more relaxed compared with the previous ones in inequalities (1).

Compared with the traditional static timing analysis method which is based on time borrowing for a level-sensitive latch, the alternative static timing analysis method based on the timing constraints in FIG. 13 or 14 needs to trace signal propagation in a path through a level-sensitive latch in a plural of clock phases or cycles, and compare a data signal arrival time at a level-sensitive latch against the latch disable signal which is supposed to turn the level-sensitive latch opaque immediately after the data signal arrives in case that no timing error occurs. This timing analysis method is more computation intensive, takes longer time and requires larger memory space for signal arrival times in multiple clock cycles. However, this method gives complete signal propagation paths across multiple logic stages, which helps the optimization method in this invention, for example, in identifying the start and the end of a timing-critical path. A further advantage from this method is that the associated timing constraints are more relaxed compared with the traditional timing constraints for level-sensitive latches based on time borrowing, giving further room for performance improvement.

To compute signal arrival times across level-sensitive latches, one needs to identify all time borrowing occurrences, for that all clock signals need to be given. The arrival times of signals which are launched by level-sensitive latches of different phases or in different clock cycles need to be separated in static timing analysis. Further, the clock signals need to be updated for different clock cycles. FIG. 16 gives a straight-forward method which is to advance in the time domain, e.g., first all clock signals of the first phase in the first clock cycle arrive, which triggers signal propagation across clock networks, to corresponding sequential element outputs, across corresponding combinational logic networks, and across any transparent level-sensitive latches, before the clock signals of the next phase arrive.

FIG. 17 gives another computation method. First the arrival times are set for all primary inputs and clock signals of all phases in the first clock cycle, then signal arrival times are computed across clock networks, at sequential element outputs, and across combinational logic networks without going through any transparent level-sensitive latch. Subsequently the arrival times of the clock signals of the first phase in a list of clock phases which are sorted in an ascending order in the time domain advance to the next clock cycle. Signal arrival times at level-sensitive latches are computed according to FIG. 12. At any occurrence of time borrowing, the signal continues to propagate across the subsequent combinational logic network. Such signal arrival times are from signal propagation across two logic stages and need to be separated from the previous signal arrival times which are from signal propagation across one logic stage. They have different setup time requirements. Subsequently for each clock phase p in the list of clock phases which are sorted in an ascending order in the time domain, the clock signals of phase p advance to the next clock cycle, and signal arrival times are computed for signal propagation across three logic stages.

Besides the increased room for performance improvement from the alternative timing constraints, transforming an edge-triggered sequential element to an equivalent module including multiple-phase level-sensitive latches gives further degrees of freedom in optimizing an integrated circuit. For example, in FIG. 18, a timing-critical signal propagation path $p_1$ ends at the input of an edge-triggered flip-flop f, while another timing-critical signal propagation path $p_2$ starts at the output of the same flip-flop f, moving the structure location of the flip-flop f cannot improve the timing performance of the integrated circuit or reduce the clock cycle time, because to shorten any signal propagation path starting at the flip-flop f such as $p_2$ unavoidably results in performance degradation of the signal propagation paths ending at the flip-flop f such as $p_1$, and vice versa. With this invention, after transforming the edge-triggered flip-flop f to an equivalent module including a master and a slave level-sensitive latch, say, the slave latch s can be relocated to reduce the signal propagation delay in the timing-critical path starting from the output of the slave latch s such as $p_2$, while any timing-critical path ending at the input of the master latch m such as $p_1$ is intact, which delay can be reduced in a subsequent optimization step such as relocating a level-sensitive latch at the start or end of the path.

Repeating this process leads to reduced signal propagation delay for an increasing number of timing-critical paths. As more edge-triggered sequential elements are transformed to equivalent modules including level-sensitive latches, there are more timing-critical paths through a level-sensitive latch or across multiple logic stages. Such long signal propagation paths have a low probability for a signal to propagate through any of them. As a result, better-than-worst-case integrated circuit design techniques can be applied. In one embodiment, one may simply set a long signal propagation path as a false path in optimizing an integrated circuit for improved power, performance and/or area if the resultant error rate is acceptable. In other embodiments, to ensure zero error rate, the integrated circuit either detects and corrects or predicts and prevents every possible timing error.

FIG. 19 illustrates an embodiment of the invention based on better-than-worst-case integrated circuit design, wherein a signal propagation path through a level-sensitive latch has its delay exceeding its setup time constraint. To ensure zero error rate, anytime that a signal propagates through the path, a monitor generates a signal which enables the clock gating scheme, thus giving an additional clock cycle for the slow logic computation to complete before resuming operation.

FIG. 19 illustrates such a monitor in the form of a finite state machine that takes input signals from combinational logic networks across multiple clock phases. Such a finite state machine can be constructed by first identifying timing-critical paths across one or more logic stages in an integrated circuit including multi-phase level-sensitive latches, subsequently selecting a subset of the side inputs of the timing-critical paths, and designing a finite state machine that outputs logic one after receiving a sequence of signals from the selected side inputs across multiple phases in a predetermined pattern. For a logic gate in a signal propagation path, a side input is an input of the logic gate that is not in the path. For a signal to propagate through the path, a side input needs to take a non-controlling logic value with respect to the logic gate. For a signal to propagate through a timing-critical path across multiple phases, the side inputs need to take non-controlling logic values in specific phases, respectively. For example, FIG. 19 shows two AND logic gates in a timing critical signal propagation path that crosses the two logic stages. The two side inputs of the two AND logic gates need to take logic one in two consecutive phases. A finite state machine can be constructed to output logic one in case that the two side inputs take logic one in two consecutive phases.

The occurrence probability for a signal to propagate through a path is given by the occurrence probability for all the side inputs of the path to take respective non-controlling logic values, and can be approximated by some of the least occurrence probabilities for a side input to take the respective non-controlling logic value. As a result, the side inputs of the least occurrence probabilities to take respective non-controlling logic values are better to be selected as the input signals of a finite state machine in a timing error predicting apparatus, such that the occurrence probability for the apparatus to predict a timing error is minimized, while the silicon cost of the apparatus is also minimized due to a small number of selected side inputs. Such an apparatus predicts every occurrence of signal propagation through a given timing-critical path, while any false alarm leads to performance degradation but no logic error.

FIG. 20 illustrates another embodiment of the invention by better-than-worst-case integrated circuit design, wherein a signal propagates through a sequence of level-sensitive latches which are controlled by clock signals in four phases. Such a sequence of latches turn transparent subsequently, and turn opaque subsequently. Each level-sensitive latch remains opaque in two consecutive phases. When a level-sensitive latch is opaque while its preceding level-sensitive latch is also opaque, there should be no signal arriving in the combinational logic network between the two opaque level-sensitive latches; otherwise, such a signal is a late arriving signal that cannot go through the receiving level-sensitive latch and will be destroyed in the subsequent logic computation. Such a late arriving signal can be detected by a timing error detecting apparatus that includes a group of comparators each taking the input and output of a level-sensitive latch at the end of a timing-critical signal propagation path. Or, in case that a signal may be too late for such an apparatus at the end of a timing-critical path to catch, an additional level-sensitive latch controlled by the same clock signal as of the level-sensitive latch at the end of the path can be inserted in the middle of a timing-critical path with a timing error detecting apparatus.

Insertion of such a timing error detecting apparatus includes identification of a group of timing-critical path which delays are within a timing margin for a given group of clock signals. A detected timing error may invoke a timing error recovery mechanism such as relaunching the faulty computation, or a timing error correction mechanism such as shifting the clock phases to capture a late signal.

For such an integrated circuit with a timing error predicting/detecting apparatus which invokes a timing error recovery/correction mechanism for functional correctness, its average performance is given by the occurrence probability of predicted/detected timing errors, its performance without timing error occurrence, and its performance at the occurrence of a timing error including any timing error recovery/correction-induced performance degradation. Subsequently, a combinational logic network in such an integrated circuit can be optimized for a statistical objective such as average performance while taking the occurrence probability of predicted/detected timing errors into consideration. For example, a timing-critical path of a tiny occurrence probability for a signal to propagate through it is suitable for better-than-worst-case design by inserting a timing error predicting/detecting apparatus around it; while a timing-critical path of a significant occurrence probability for a signal to propagate through it is better for a combinational logic optimization or latch removal and insertion method to reduce its signal propagation delay.

FIG. 21 illustrates an embodiment of the present invention, an optimization system and method for an integrated circuit including multi-phase latches. Specifically, for the top timing-critical path identified by the said timing analysis method based on the said timing constraints, its delay can be reduced by either (1) latch removal and insertion at the start or end of the timing-critical path, (2) insertion of a timing error predicting or detecting apparatus which enables better-than-worst-case design possibly with a timing error recovery or correction mechanism, or (3) combinational logic optimization. The optimizer chooses the best optimization solution for each timing-critical path based on the performance improvement and the cost. The optimization process proceeds to the next timing-critical path, until all design requirements are met.

FIG. 22 illustrates the preferred embodiment of the present invention, an integrated circuit optimization system and method comprising the steps of transforming an edge-triggered sequential element to an equivalent module including multi-phase level-sensitive latches, level-sensitive latch retiming, and any further transformation to level-sensitive latches, level-sensitive latch retiming and better-than-worst-case design techniques. As usual an iterative process is performed to optimize an integrated circuit incrementally until design closure is achieved satisfying all design specifications.

In this patent, certain U.S. patents, U.S. patent applications, and other materials (e.g., articles) have been incorporated by reference. The text of such U.S. patents, U.S. patent applications, and other material is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having benefit of this description of the invention. Changes may be made in the elements described herein without departing from the spirit and scope of the invention as described in the following claims.

What is claimed is:

1. A method of optimizing an integrated circuit comprising edge-triggered sequential elements, said method comprising:
    transforming an edge-triggered sequential element into an equivalent module including level-sensitive latches of multiple phases at a same location of the edge-triggered sequential element in an integrated circuit; and
    moving location of one of the level-sensitive latches in a timing-critical signal propagation path in the integrated circuit;
    wherein transforming the edge-triggered sequential element at start of the timing-critical signal propagation path, further including,
        finding a fanin cone of a moved level-sensitive latch by traversing a netlist from each input of a level-sensitive latch until reaching a sequential element or a primary input;
        transforming any edge-triggered sequential element at an input of the fanin cone into an equivalent module having a multi-phase level-sensitive latch, after including the edge-triggered sequential element at any primary input at an input of the fanin cone;

removing a level-sensitive latch of a clock phase at each input of the fanin cone; and inserting the level-sensitive latch of the clock phase at each output of the fanin cone.

2. A method as described in claim 1 wherein said transformed edge-triggered sequential element is at the end of a timing-critical signal propagation path, said method further comprising the steps of c) finding a fanout cone of a relocated level-sensitive latch by traversing a netlist from each output of said relocated level-sensitive latch until reaching a sequential element or a primary output;

d) transforming any edge-triggered sequential element at an output of said fanout cone into an equivalent module including multi-phase level-sensitive latches, after including an edge-triggered sequential element at any primary output at an output of the fanout cone;

e) removing a level-sensitive latch of a specific clock phase at each output of said fanout cone; and f) inserting a level-sensitive latch of said clock phase at each input of said fanout cone.

3. A method as described in claim 1 further comprising the step of optimizing said integrated circuit after setting a timing-critical signal propagation path as a false path.

4. A method as described in claim 3 further comprising the step of including a timing error prediction or detection module in said integrated circuit which gives a signal indicating a timing error when a signal propagates through said timing-critical path.

5. A method as described in claim 4 further comprising the steps of a) finding some side input of said timing-critical signal propagation path which has a small probability to take its non-controlling logic value to allow a signal to propagate in said timing-critical path; and b) constructing an integrated circuit module which outputs a signal indicating a timing error when said side input takes its non-controlling logic value.

6. A method as described in claim 4 wherein said timing error detection module includes a comparator that outputs a signal indicating a timing error when the input and output signals of a level-sensitive latch do not match when said level-sensitive latch is opaque and any preceding level-sensitive latch is also opaque.

7. A method as described in claim 1 further comprising an iteration of steps as described in claim 1 or claim 2 or claim 3.

8. A computer readable medium for storing instructions that when executed by a computer implement the method as described in claim 1.

9. A computer readable medium as described in claim 1 wherein modifying a netlist includes insertion of an apparatus as described in claim 1.

10. A computer readable medium as described in claim 1 wherein netlist modification includes level-sensitive latch removal and insertion.

11. A computer readable medium as described in claim 7 wherein modifying the netlist comprises the steps e1) identifying a timing-critical path that crosses one or a plurality of level-sensitive latches;

e2) identifying the side inputs of said path which have the least probabilities to take their respective non-controlling logic values; and e3) inserting a finite state machine that takes input signals from said side inputs.

12. A computer readable medium as described in claim 1 wherein modifying the netlist includes insertion of a level-sensitive latch in a timing-critical path.

13. A method of optimizing an integrated circuit comprising edge-triggered sequential elements, said method comprising:

transforming an edge-triggered sequential element into an equivalent module including level-sensitive latches of multiple phases; and identifying a location in an integrated circuit of one of said level-sensitive latches, and computing signal arrival times via a statistical method that takes parametric variations for signal propagation paths across a bounded number of said level-sensitive latches.

14. A method of optimizing an integrated circuit comprising edge-triggered sequential elements, said method comprising:

transforming an edge-triggered sequential element into an equivalent module including level-sensitive latches of multiple phases at a same location of the edge-triggered sequential element in an integrated circuit; and moving location of one of the level-sensitive latches in a timing-critical signal propagation path in the integrated circuit;

wherein transforming the edge-triggered sequential element at an end of a timing-critical signal propagation path further includes, finding a fanout cone of a relocated level-sensitive latch by traversing a netlist from each output of a relocated level-sensitive latch until reaching a sequential element or a primary output;

transforming any edge-triggered sequential element at an output of the fanout cone into an equivalent module including multi-phase level-sensitive latches, after including an edge-triggered sequential element at any primary output at an output of the fanout cone;

removing a level-sensitive latch of a specific clock phase at each output of the fanout cone; and inserting a level-sensitive latch of the clock phase at each input of the fanout cone.

* * * * *